United States Patent
Fukuda

(10) Patent No.: US 10,601,524 B2
(45) Date of Patent: Mar. 24, 2020

(54) TRANSMISSION/RECEPTION DEVICE AND TRANSMISSION/RECEPTION METHOD

(71) Applicant: SONY SEMICONDUCTOR SOLUTIONS CORPORATION, Kanagawa (JP)

(72) Inventor: Shinichi Fukuda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/310,213

(22) PCT Filed: Jul. 20, 2017

(86) PCT No.: PCT/JP2017/026183
§ 371 (c)(1),
(2) Date: Dec. 14, 2018

(87) PCT Pub. No.: WO2018/025641
PCT Pub. Date: Feb. 8, 2018

(65) Prior Publication Data
US 2019/0260479 A1    Aug. 22, 2019

(30) Foreign Application Priority Data
Aug. 3, 2016    (JP) .................. 2016-152955

(51) Int. Cl.
*H04B 13/00*    (2006.01)
*H04B 5/02*    (2006.01)

(52) U.S. Cl.
CPC ............. *H04B 13/005* (2013.01); *H04B 5/02* (2013.01); *H04B 13/00* (2013.01)

(58) Field of Classification Search
CPC combination set(s) only.
See application file for complete search history.

(56) References Cited

U.S. PATENT DOCUMENTS

2005/0239519 A1* 10/2005 Saitou .................... H01Q 1/243
455/575.1
2008/0261523 A1    10/2008 Kubono et al.
(Continued)

FOREIGN PATENT DOCUMENTS

CN        101006667 A     7/2007
HK          1101735 A1     6/2011
(Continued)

OTHER PUBLICATIONS

International Search Report and Written Opinion of PCT Application No. PCT/JP2017/026183, dated Sep. 5, 2017, 09 pages of ISRWO.

(Continued)

*Primary Examiner* — Edward F Urban
*Assistant Examiner* — Ralph H Justus
(74) *Attorney, Agent, or Firm* — Chip Law Group

(57) ABSTRACT

The present disclosure relates to a transmission/reception device, a transmission/reception method, and a program that enable transmission and reception in either a two-pole configuration or a three-pole configuration by switching with the same circuit configuration in human body communication.

A first switch that switches, by on or off, connection to a human body side electrode connected to one of transmission drivers each transmitting a signal by a differential output, and a second switch that switches, by on or off, connection to a space side electrode connected to the other are provided, and in the case of the two-pole configuration, the switch to which the electrode is not connected is used by being fixed to off, the switch to which the electrode is connected is turned on at the time of transmission and turned off at the time of reception, and a terminal is grounded to which the electrode is not connected among terminals connected to a (Continued)

reception unit. Furthermore, in the case of the three-pole configuration, both switches are turned on at the time of transmission, and turned off at the time of reception. The present disclosure can be applied to a human body communication device.

7 Claims, 27 Drawing Sheets

(56) References Cited

U.S. PATENT DOCUMENTS

| | | | | |
|---|---|---|---|---|
| 2009/0275293 | A1* | 11/2009 | Ida | H04B 13/005 455/73 |
| 2011/0200150 | A1* | 8/2011 | Fazzi | H04B 13/005 375/343 |

FOREIGN PATENT DOCUMENTS

| | | |
|---|---|---|
| JP | 2006-324774 A | 11/2006 |
| JP | 2010-278500 A | 12/2010 |
| KR | 10-2008-0011154 A | 1/2008 |
| MY | 142883 A | 1/2011 |
| TW | 200703938 A | 1/2007 |
| WO | 2006/132058 A1 | 12/2006 |
| WO | 2017/090461 A1 | 6/2017 |
| WO | 2017/098951 A1 | 6/2017 |

OTHER PUBLICATIONS

Hachisuka, et al., "Signal Transmission Modeling of the Intrabody Communication and Experimental Analyses", Journal of Japan Institute of Electronics Packaging, vol. 10, Issue 6, 2007, 462-468 pages.

Hachisuka, et al., "Signal Transmission Modeling of the Intrabody Communication and Experimental Analyses", Journal of Japan Institute of Electronics Packaging, vol. 10, Issue 6, Sep. 2007, 462-468 pages.

Hachisuka, et al., "Signal Transmission Modeling of the Intrabody Communication and Experimental Analyses", Journal of Japan Institute of Packaging, vol. 10, No. 6, Sep. 2007, 462-468 pages.

* cited by examiner

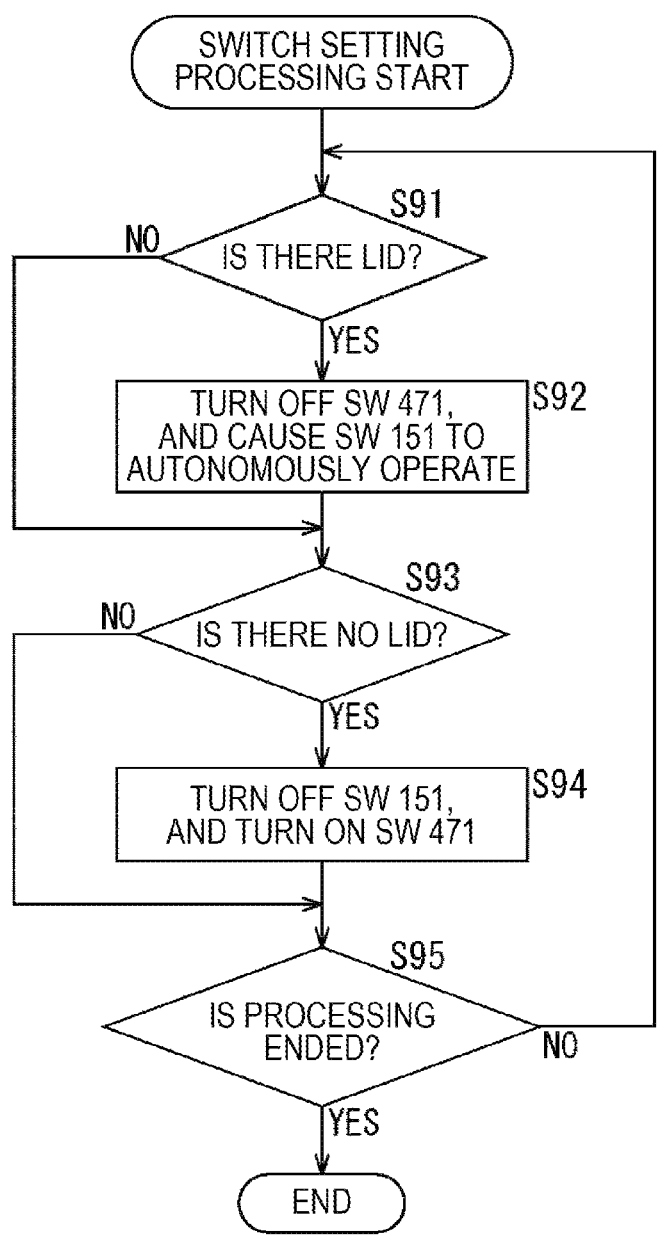

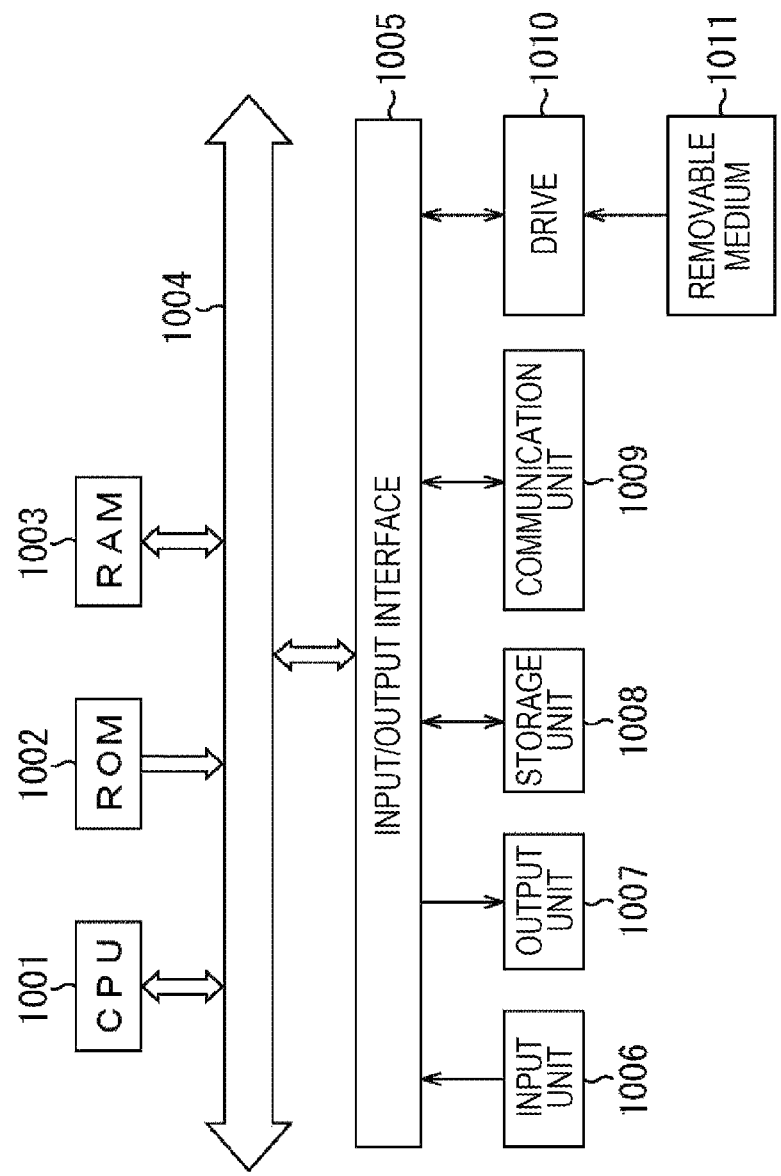

TRANSMISSION/RECEPTION DEVICE AND TRANSMISSION/RECEPTION METHOD

CROSS REFERENCE TO RELATED APPLICATIONS

This application is a U.S. National Phase of International Patent Application No. PCT/JP2017/026183 filed on Jul. 20, 2017, which claims priority benefit of Japanese Patent Application No. JP 2016-152955 filed in the Japan Patent Office on Aug. 3, 2016. Each of the above-referenced applications is hereby incorporated herein by reference in its entirety.

TECHNICAL FIELD

The present disclosure relates to a transmission/reception device, a transmission/reception method, and a program, and in particular relates to a transmission/reception device, a transmission/reception method, and a program that enable transmission/reception adaptively corresponding to a required electrode configuration in human body communication.

BACKGROUND ART

Communication technology generally called human body communication via a human body communication network called a Body Area Network (BAN) is becoming widespread (for example, see Patent Document 1).

The BAN is a wireless network assuming that information of a sensor disposed on the surface or the inside of a human body, or the like is wirelessly collected.

CITATION LIST

Patent Document

Patent Document 1: Japanese Patent Application Laid-Open No. 2006-324774

SUMMARY OF THE INVENTION

Problems to be Solved by the Invention

By the way, examples of a configuration of a transmission/reception device called the BAN include a configuration including a differential electrode (three-pole electrode) and a configuration including a single electrode (two-pole electrode), and depending on the exterior and function configuration of the device on which the transmission/reception device is mounted, the configuration of the electrode to be employed is different.

However, when the exterior and function of the device on which the transmission/reception device is mounted changes, a required electrode configuration may change, and it is therefore necessary to replace a transmission/reception device with the configuration including the differential electrode (three-pole electrode) and a transmission/reception device with the configuration including the single electrode (two-pole electrode) with each other.

The present disclosure has been made in view of such a situation, and in particular, intends to be enabled to switch and use the same circuit configuration depending on the required electrode configuration in the configuration of the transmission/reception device in the human body communication.

Solutions to Problems

A transmission/reception device of an aspect of the present disclosure includes: a transmission unit used at time of transmission of a signal using a human body as a communication medium; a reception unit used at time of reception of the signal using the human body as the communication medium; and a switching unit that switches circuit configurations of the transmission unit and the reception unit depending on an electrode configuration.

The electrode configuration can be one of a three-pole configuration including three electrodes and a two-pole configuration including two electrodes.

The transmission/reception device can be made to further include: a circuit board Gnd including a Gnd pattern functioning as an electrode of a circuit board on which a circuit configuring the transmission unit and the reception unit is provided; a first switch that switches, by on or off, connection to a first electrode connected to one of transmission drivers each transmitting a signal by a differential output transmitting a signal by a differential output by operation of the transmission unit; and a second switch that switches, by on or off, connection to a second electrode connected to another of the transmission drivers, in which the switching unit, in a case where either the first electrode or the second electrode is not connected, regards the electrode configuration as the two-pole configuration, and fixedly sets to off the first switch or the second switch to which either the first electrode or the second electrode is not connected, and causes the first switch or the second switch to which either the first electrode or the second electrode is connected, to turn on at the time of transmission and to turn off at the time of reception, and in a case where both the first electrode and the second electrode are connected, regards the electrode configuration as the three-pole configuration, and causes the first switch and the second switch to turn on at the time of transmission and to turn off at the time of reception.

The switching unit can be made such that operation is set by a setting device outside, and in a case where the electrode configuration is the three-pole configuration and neither the first switch nor the second switch is fixedly set to off by the setting device, the switching unit causes the first switch and the second switch to turn on at the time of transmission and to turn off at the time of reception, and in a case where the electrode configuration is the two-pole configuration and the first switch or the second switch is fixedly set to off by the setting device, the switching unit causes the first switch or the second switch not set to the off to turn on at the time of transmission and to turn off at the time of reception.

The transmission/reception device can be made to further include a setting unit that sets operation of the switching unit, in which in a case where the electrode configuration is the three-pole configuration and neither the first switch nor the second switch is fixedly set to off by the setting unit, the switching unit causes the first switch and the second switch to turn on at the time of transmission, and causes the first switch and the second switch to turn off at the time of reception, and in a case where the electrode configuration is the two-pole configuration and the first switch or the second switch is fixedly set to off by the setting unit, the switching unit causes the first switch or the second switch not set to the off to turn on at the time of transmission and to turn off at the time of reception.

The setting unit can be made to determine whether the electrode configuration is the two-pole configuration or the three-pole configuration depending on whether or not a configuration detachable to the transmission/reception device and including one of the first electrode and the second electrode is attached, and to set the operation of the switching unit depending on a determination result.

The configuration including one of the first electrode and the second electrode can be made to include a jacket attached to a smartphone when the transmission/reception device is the smartphone, or a lid of a wristwatch when the transmission/reception device is the wristwatch.

The transmission/reception device can be made to further include: a circuit board Gnd including a Gnd pattern functioning as an electrode of a circuit board on which a circuit configuring the transmission unit and the reception unit is provided; and two terminals respectively connectable to the first electrode and the second electrode in the reception unit except the circuit board Gnd, in which in a case of the circuit board Gnd, the first electrode, and the second electrode, the switching unit grounds, to the circuit Gnd, a terminal to which the electrode is not connected among the two terminals.

The first electrode and the second electrode can be made to include a human body side electrode and a space side electrode.

A transmission/reception method of an aspect of the present disclosure is a transmission/reception method of a transmission/reception device including: a transmission unit used at time of transmission of a signal using a human body as a communication medium; and a reception unit used at time of reception of the signal using the human body as the communication medium, the transmission/reception method including a step of switching circuit configurations of the transmission unit and the reception unit depending on an electrode configuration.

A program of an aspect of the present disclosure causes a computer to function as: a transmission unit used at time of transmission of a signal using a human body as a communication medium; a reception unit used at time of reception of the signal using the human body as the communication medium; and a switching unit that switches circuit configurations of the transmission unit and the reception unit depending on an electrode configuration.

According to an aspect of the present disclosure, the circuit configurations of the transmission unit used at the time of transmission of the signal using the human body as the communication medium, and the reception unit used at the time of reception of the signal using the human body as the communication medium can be switched depending on the electrode configuration.

Effects of the Invention

According to an aspect of the present disclosure, it is possible to switch and use the same circuit configuration depending on the required electrode configuration in the configuration of the transmission/reception device in the human body communication.

BRIEF DESCRIPTION OF DRAWINGS

FIG. 26 is a flowchart for describing switch control processing of the transmission/reception device of FIGS. 24 and 25.

FIG. 27 is a diagram for describing a configuration example of a general purpose personal computer.

MODE FOR CARRYING OUT THE INVENTION

Preferred embodiments of the present disclosure will be described in detail below with reference to the accompanying drawings. Note that, in the present specification and the drawings, constituents having substantially the same functional configuration are denoted by the same reference signs, and redundant explanations are omitted.

<Communication System Using Conventional Human Body Communication>

Figure 1:
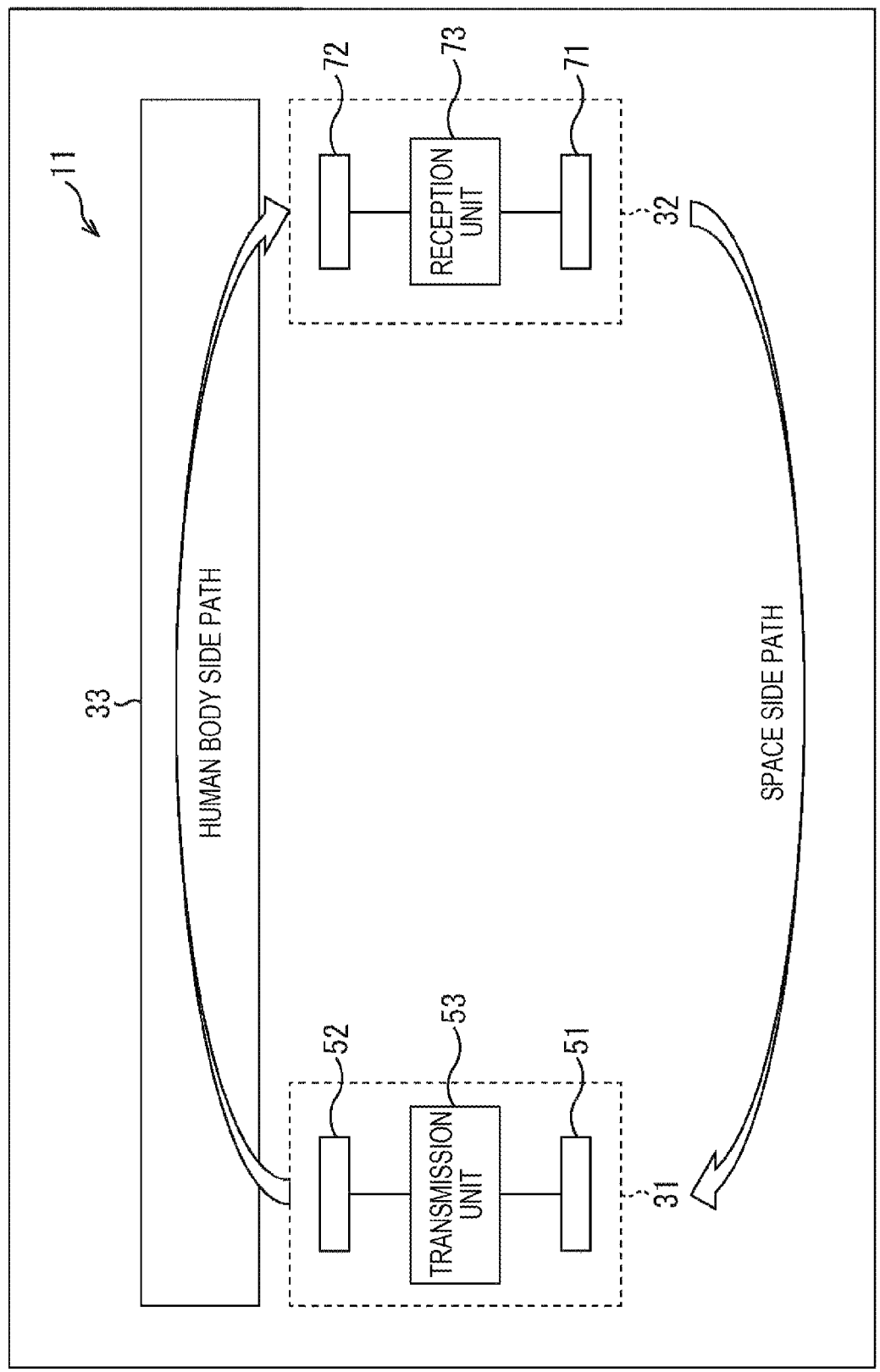
FIG. 1 is a diagram for describing a configuration of a conventional transmission/reception device.

FIG. 1 is a diagram illustrating a configuration example of a communication system using human body communication to which a technology of the present disclosure is applied.

In FIG. 1, a communication system 11 includes a transmission device 31, a reception device 32, and a communication medium 33, and is a system in which the transmission device 31 and the reception device 32 transmit and receive signals via the communication medium 33. That is, in the communication system 11, a signal transmitted from the transmission device 31 is transmitted via the communication medium 33 and received by the reception device 32.

The transmission device 31 includes a transmission reference electrode 51, a transmission signal electrode 52, and a transmission unit 53. The transmission signal electrode 52 is one electrode of an electrode pair provided for transmitting a signal to be transmitted via the communication medium 33, and is provided such that electrostatic coupling to the communication medium 33 becomes stronger than that of the transmission reference electrode 51 that is the other electrode of the electrode pair. The transmission unit 53 is provided between the transmission signal electrode 52 and the transmission reference electrode 51, and provides an electric signal (potential difference) to be transmitted to the reception device 32 between these electrodes.

The reception device 32 includes a reception reference electrode 71, a reception signal electrode 72, and a reception unit 73. The reception signal electrode 72 is one electrode of an electrode pair provided for receiving a signal transmitted via the communication medium 33, and is provided such that electrostatic coupling to the communication medium 33 becomes stronger than that of the reception reference electrode 71 that is the other electrode of the electrode pair. The reception unit 73 is provided between the reception signal electrode 72 and the reception reference electrode 71, detects an electric signal (potential difference) generated between these electrodes by the signal transmitted via the communication medium 33, converts the electric signal into a desired electric signal, and restores the electric signal generated by the transmission unit 53 of the transmission device 31.

The communication medium 33 includes a substance having a physical characteristic capable of transmitting an electric signal, such as a conductor, a dielectric, or the like. For example, the communication medium 33 includes a conductor typified by a metal such as copper, iron, or aluminum, a dielectric typified by pure water, rubber, glass or the like, or a living body or the like that is a composite thereof, or a material having both a property as a conductor and a property as a dielectric, like an electrolytic solution such as saline. Furthermore, a shape of the communication medium 33 may be any shape, and may be, for example, a linear shape, a plate shape, a spherical shape, a prismatic shape, a cylindrical shape, or the like and may be any shape other than these shapes.

With this configuration, a weak current flows to the reception signal electrode 72 of the reception device 32 from the transmission signal electrode 52 of the transmission device 31 via the human body that is the communication medium 33. A path through which this signal flows is referred to as a human body side path.

Furthermore, the same amount of the signal current flowing from the transmission device 31 to the reception device 32 via the human body side path returns from the reception device 32 to the transmission device 31. The electric signal is transmitted by the transmission reference electrode 51 by changing an electric field of a peripheral space, from the reception reference electrode 71 provided at a position distant from the human body that is the communication medium 33. This path is referred to as a space side path.

<Configurations of Transmission Device and Reception Device>

Figure 2:
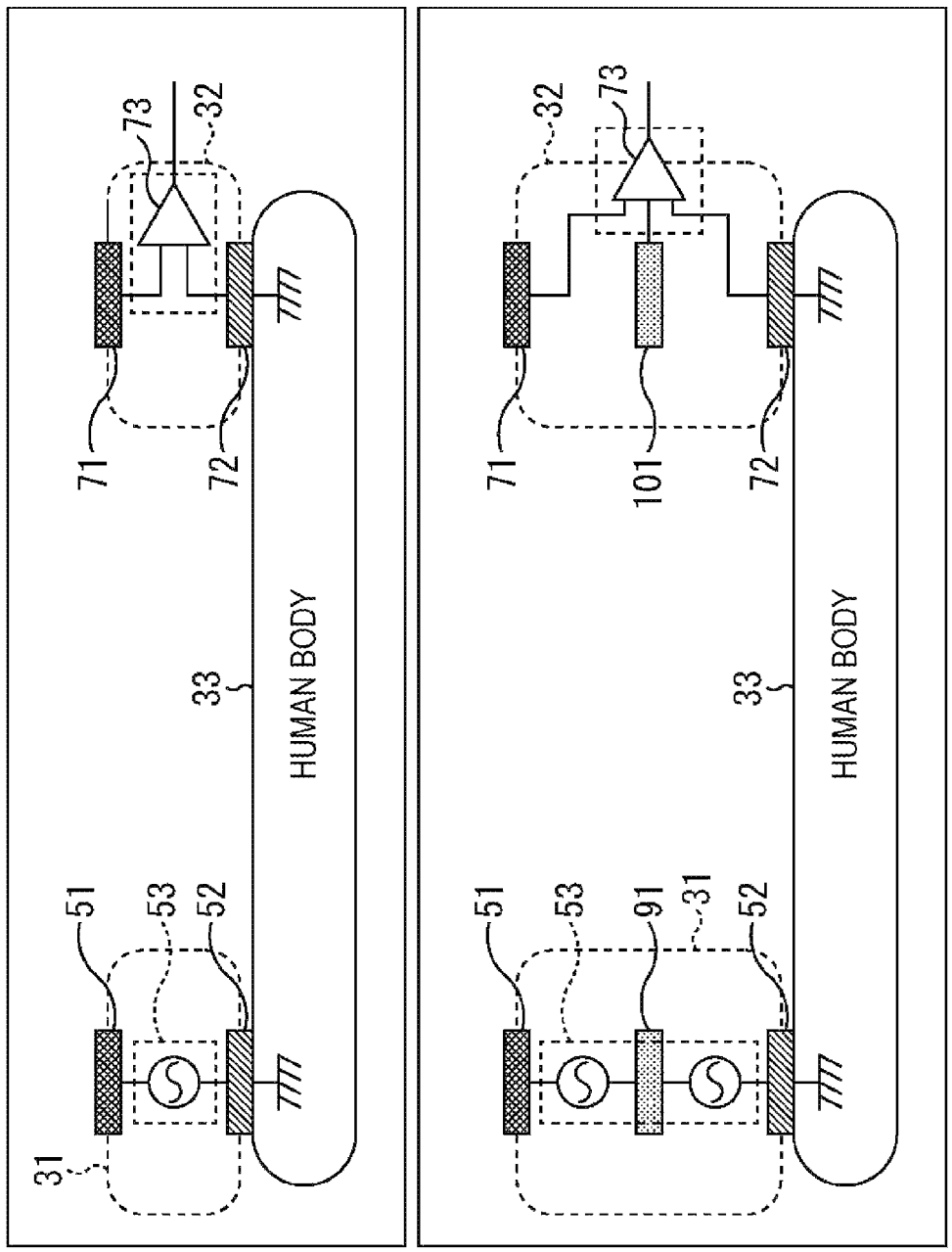
FIG. 2 is a diagram for describing a two-pole configuration and a three-pole configuration in the transmission/reception device of FIG. 1.

Roughly two kinds of configurations are devised of the transmission device 31 and the reception device 32, and one is a two-pole configuration (single electrode) as illustrated in the upper part of FIG. 2 and the other is a three-pole configuration (differential electrode) as illustrated in the lower part of FIG. 2.

In the two-pole configuration, the transmission device 31 includes an electrode configuring the transmission signal electrode 52 from the transmission unit 53 that generates an electric signal, and an electrode corresponding to the transmission reference electrode 51. Furthermore, in the two-pole configuration, the reception device 32 includes an electrode configuring the reception signal electrode 72 from the reception unit 73 that receives an electric signal, and an electrode corresponding to the reception reference electrode 71.

On the other hand, in the three-pole configuration, the transmission device 31 includes an electrode including a circuit board 91, in addition to the electrode configuring the transmission signal electrode 52 from the transmission unit 53 that generates the electric signal, and the electrode corresponding to the transmission reference electrode 51. Furthermore, the reception device 32 includes an electrode including a circuit board 101, in addition to the electrode configuring the reception signal electrode 72 from the reception unit 73 that receives the electric signal, and the electrode corresponding to the reception reference electrode 71.

In the two-pole configuration and the three-pole configuration, communication characteristics are different from each other, and superiorities at the time of transmission and at the time of reception are different from each other. In other words, at the time of transmission, the three-pole configuration has a more advantageous communication characteristic than the two-pole configuration, but at the time of reception, the two-pole configuration has a more advantageous communication characteristic than the three-pole configuration.

<Configuration Example of Conventional Transmission/Reception Device>

With reference to a functional block diagram of FIG. 3, a function will be described implemented by a conventional transmission/reception device 111.

The transmission/reception device 111 includes a circuit board (circuit board electrode (circuit board Gnd)) 131 including a space side electrode 121, a human body side electrode 122, and an IC 150. Furthermore, the IC 150 includes drivers 141a and 141b, a reception input amplifier (Low Noise Amplifier (LNA)) 142, switches (SW) 151 and 152, a transmission signal processing unit 161, and a reception signal processing unit 162.

The transmission signal processing unit 161 controls the drivers 141a and 141b and the switches (SW) 151 and 152 to transmit a transmission signal in the three-pole configuration of the space side electrode 121, the circuit board 131, and the human body side electrode 122.

The switch 151 switches electrical connection between the driver 141a and the space side electrode 121 via a connection terminal 171-2 on the IC 150 and a terminal 181 on the circuit board 131. The switch 152 switches electrical connection between the driver 141b and the human body side electrode 122 via a connection terminal 172-2 on the IC 150 and a terminal 182 on the circuit board 131. More specifically, the switches 151 and 152 are controlled to be turned on at the time of transmission and to be turned off at the time of reception.

One terminal of the reception input amplifier 142 is connected to the space side electrode 121 via a connection terminal 171-1 on the IC 150 and the terminal 181, and the other terminal is connected to the human body side electrode 122 via a connection terminal 172-1 on the IC 150 and the terminal 182. The reception signal processing unit 162 performs signal processing on an output signal of the reception input amplifier 142 as a reception signal. The reception signal processing unit 162 receives in the three-pole configuration of the space side electrode 121, the circuit board 131, and the human body side electrode 122.

Figure 3:
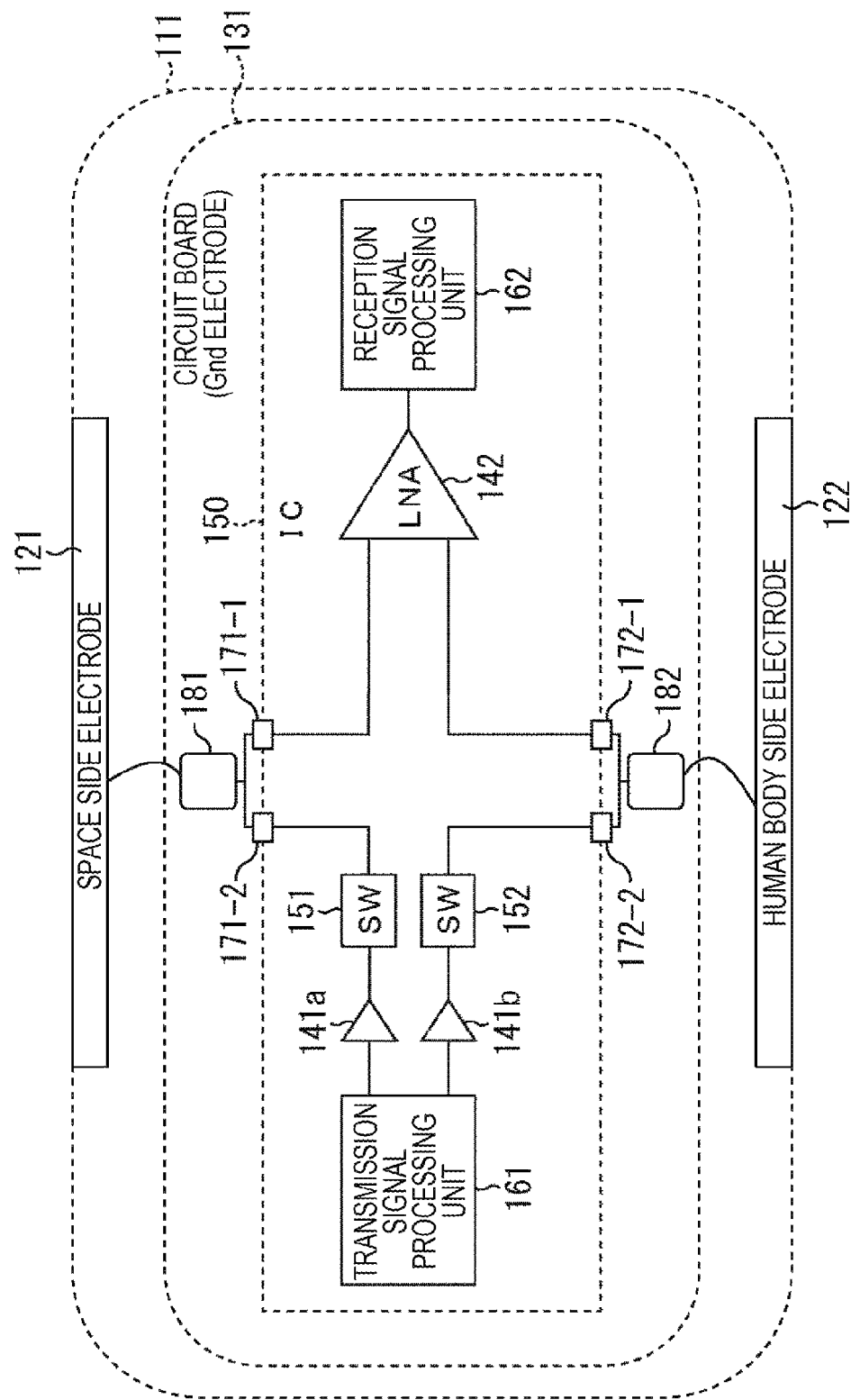
FIG. 3 is a block diagram for describing a configuration example in a case of a three-pole configuration in a case where there are two connection terminals in the conventional transmission/reception device.

By the way, in the transmission/reception device 111, there is not only a case where the three-pole configuration as illustrated in FIG. 3 is required but also a case where the two-pole configuration is required. When one with the three-pole configuration and one with the two-pole configuration are manufactured respectively depending on applications, it is necessary to respectively provide production lines and the like, and as a result, the cost may be increased.

The transmission/reception device 111 of FIG. 3 is therefore has a configuration that can be the two-pole configuration or the three-pole configuration by switching a switch or the like.

Figure 4:
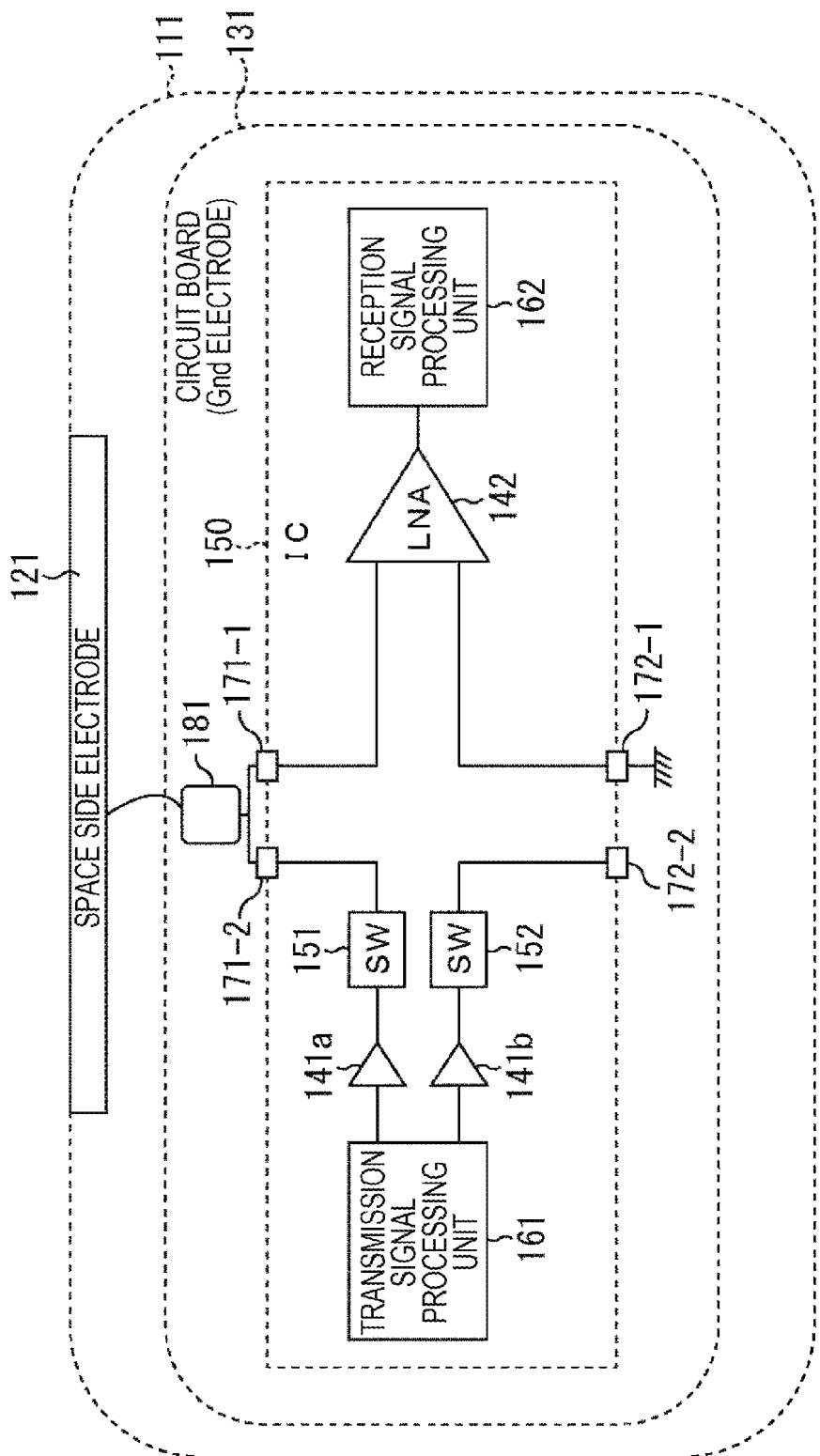
FIG. 4 is a block diagram for describing a configuration example in a case of a two-pole configuration in the case where there are two connection terminals in the conventional transmission/reception device.

In other words, for example, by removing the human body side electrode 122 as illustrated in FIG. 4, the transmission/reception device 111 of FIG. 3 can be set as the two-pole configuration.

In other words, as illustrated in FIG. 4, the human body side electrode 122 in FIG. 3 is removed together with the terminal 182, the connection terminal 172-1 is grounded to Gnd, and the connection terminal 172-2 is set in the open state.

As a result, as illustrated in FIGS. 3 and 4, the transmission/reception device 111 can be used as the three-pole configuration or the two-pole configuration.

Figure 5:
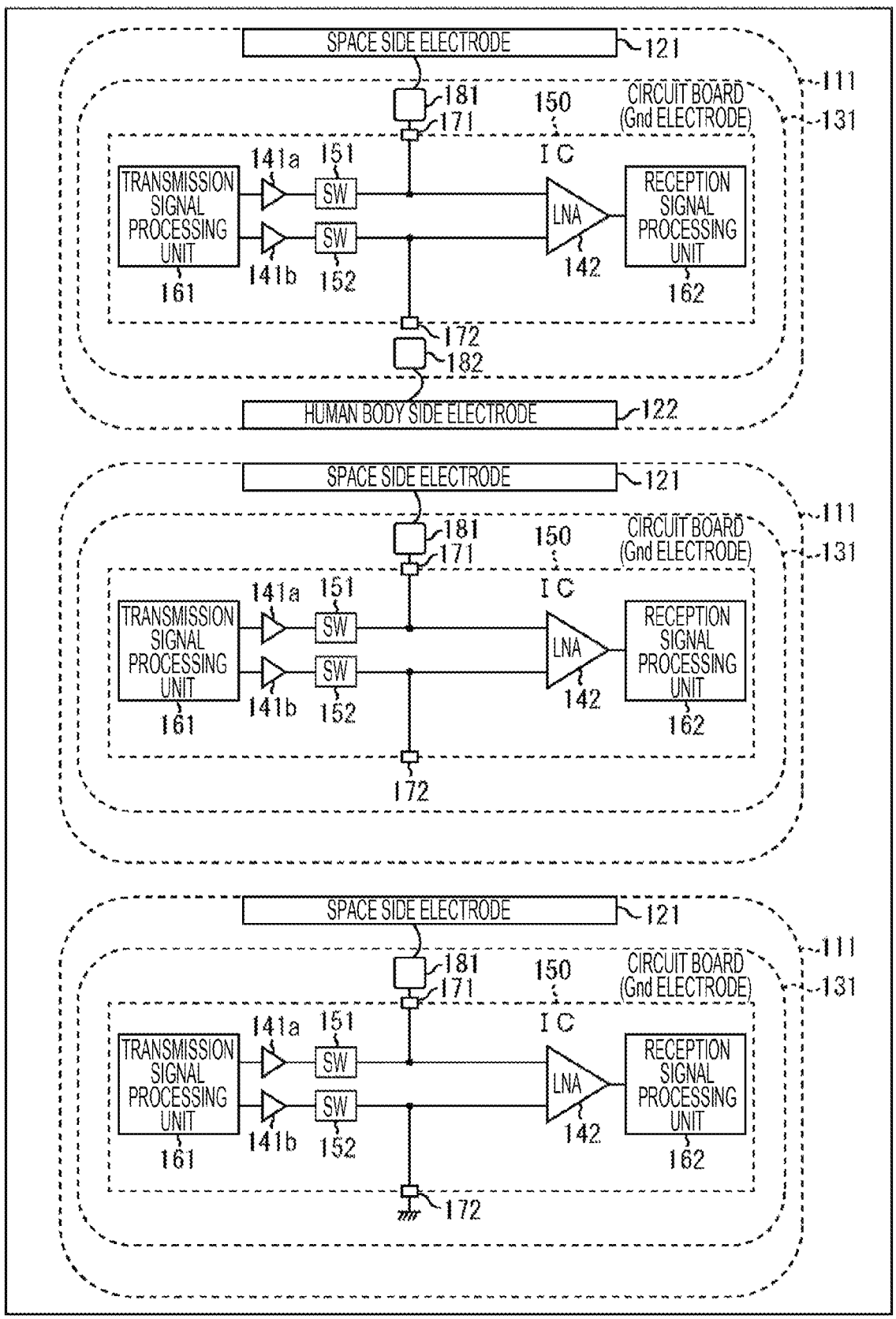
FIG. 5 is a block diagram for describing configuration examples in the cases of the three-pole configuration and the two-pole configuration in a case where there is one connection terminal in the conventional transmission/reception device.

By the way, as illustrated in the upper part of FIG. 5, if the connection terminals 171-1 and 171-2, and 172-1 and 172-2 are respectively made to be combined connection terminals 171 and 172, the number of connection terminals can be reduced, so that the cost can be reduced.

In the case of the upper part of FIG. 5, the transmission/reception device 111 can function as a three-pole configuration device.

However, in a case where it is attempted to cause the transmission/reception device 111 illustrated in the upper part of FIG. 5 to function as the transmission/reception device 111 having the two-pole configuration, it is necessary to consider treatment of the connection terminal not connected to any electrode.

For example, as illustrated in the middle part of FIG. 5, in a case where only the terminal 182 and the human body side electrode 122 are removed, the connection terminal 172 is in the open state. In this case, the connection terminal 172 is in a high impedance state, and the reception signal processing unit 162 is in a state where noise is easily picked up.

Furthermore, it is also conceivable to ground the connection terminal 172 as illustrated in the lower part of FIG. 5. In this case, the output current may become excessive with respect to the driver 141b, and the driver 141b may be destroyed.

A transmission/reception device 111 of the present disclosure intends to be enabled to appropriately switch and use the three-pole configuration and the two-pole configuration in the same circuit configuration depending on a configuration of a device on which the transmission/reception device 111 is mounted even in a case where the connection terminals 171-1 and 171-2, and 172-1 and 172-2 are respectively made to be the combined connection terminals 171 and 172 in the conventional device as described above. Hereinafter, the transmission/reception device 111 of the present disclosure will be described.

<Exterior Configuration Example of Transmission/Reception Device of the Present Disclosure>

Figure 6:
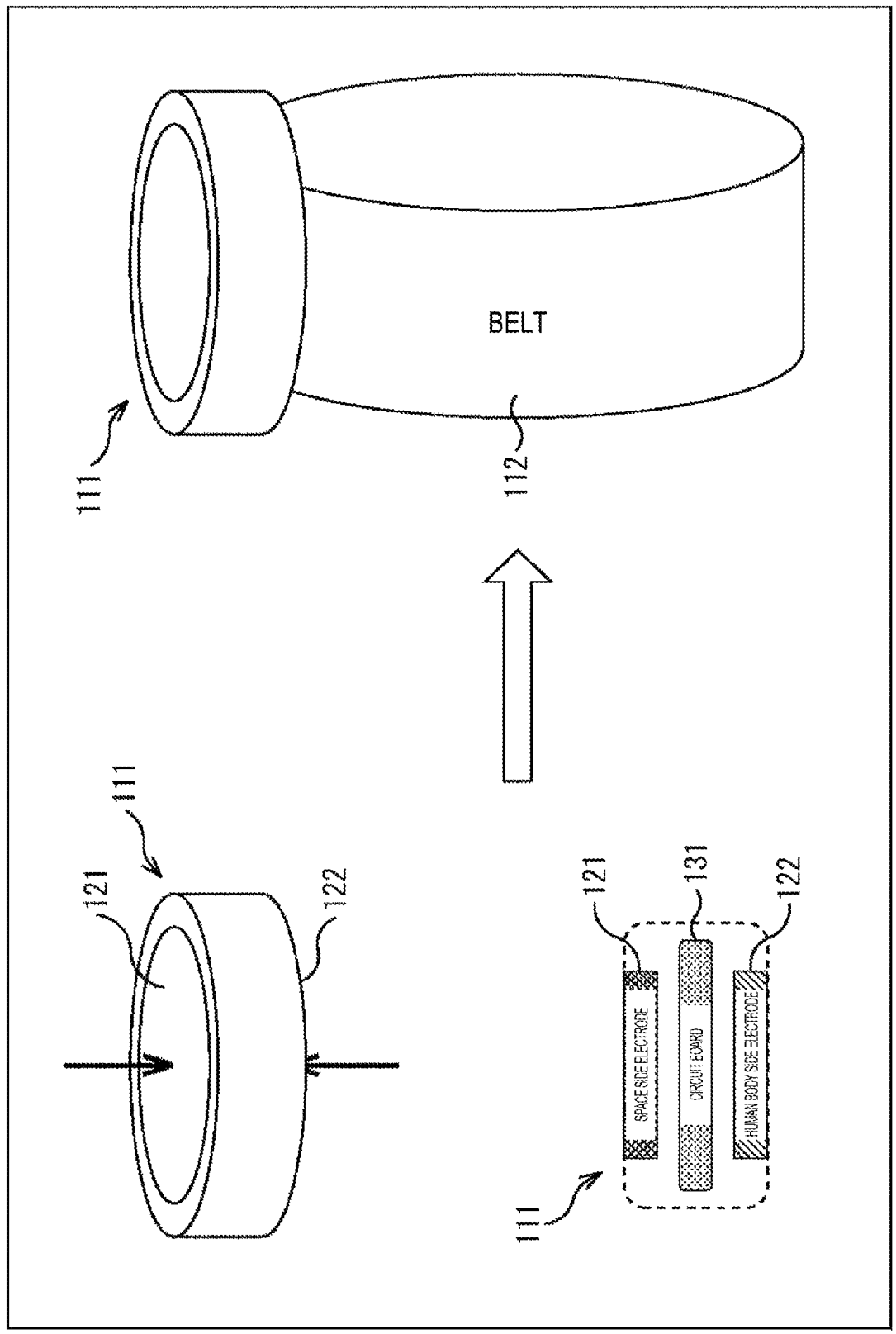
FIG. 6 is an exterior perspective view for describing an exterior of a transmission/reception device of the present disclosure.

FIG. 6 illustrates an exterior configuration example of the transmission/reception device 111 enabled to switch and use, with the same circuit, the three-pole configuration and the two-pole configuration of the present disclosure.

The transmission/reception device 111 of the present disclosure has, for example, a disc-like exterior configuration, and the upper surface in the upper left part of FIG. 6 is the space side electrode 121 that is not in contact with the communication medium 33 including a human body, and the lower surface in the upper left part of FIG. 6 is the human body side electrode 122 that is in contact with the communication medium 33 including the human body.

Moreover, as illustrated in a schematic cross-sectional view including the lower left part of FIG. 6, the circuit board 131 is provided between the space side electrode 121 and the human body side electrode 122. Note that, the space side electrode 121, the human body side electrode 122, and the circuit board 131 are respectively the transmission reference electrode 51, the transmission signal electrode 52, and the circuit board 91 in the transmission device 31 of FIG. 2, and correspond to the reception reference electrode 71, the reception signal electrode 72, and the circuit board 101 in the reception device 32.

For this reason, for example, as illustrated in the right part of FIG. 6, the transmission/reception device 111 can also be caused to function as a wearable terminal attached to the human body by being attached to a belt 112 like a wristwatch. In other words, in this case, in a case where the transmission/reception device 111 is attached using the belt 112, the human body side electrode 122 is brought into contact with an arm of the human body to which the belt 112 is attached, and the space side electrode 121 that is the opposite surface is exposed to a space.

<Detailed Configuration Example of Transmission/Reception Device of the Present Disclosure>

Next, with reference to FIGS. 7 and 8, a detailed configuration example will be described of the transmission/reception device 111 of the present disclosure.

Figure 7:
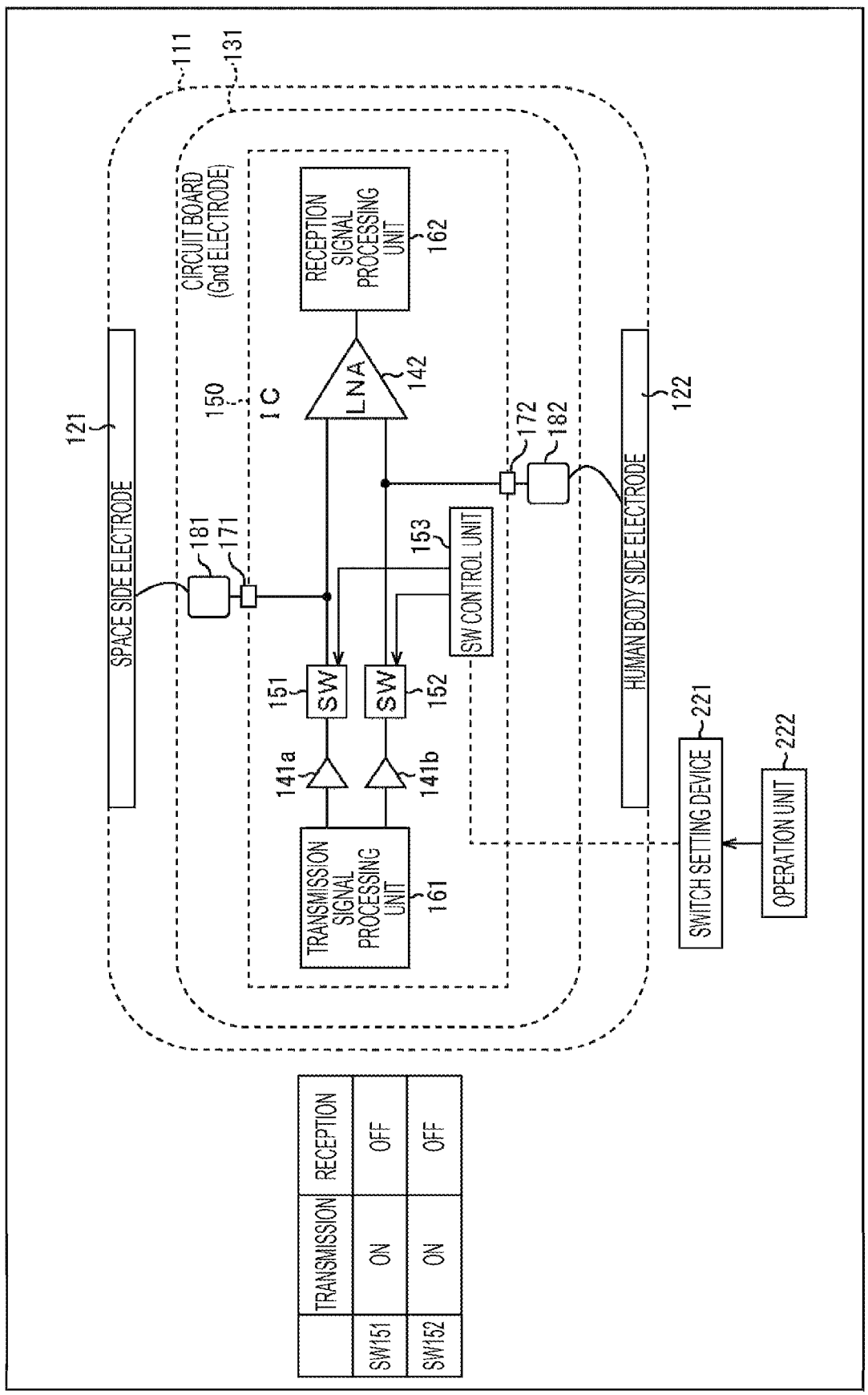
FIG. 7 is a diagram for describing a configuration example in the case of the three-pole configuration in a first embodiment of the transmission/reception device of FIG. 6.
Figure 8:
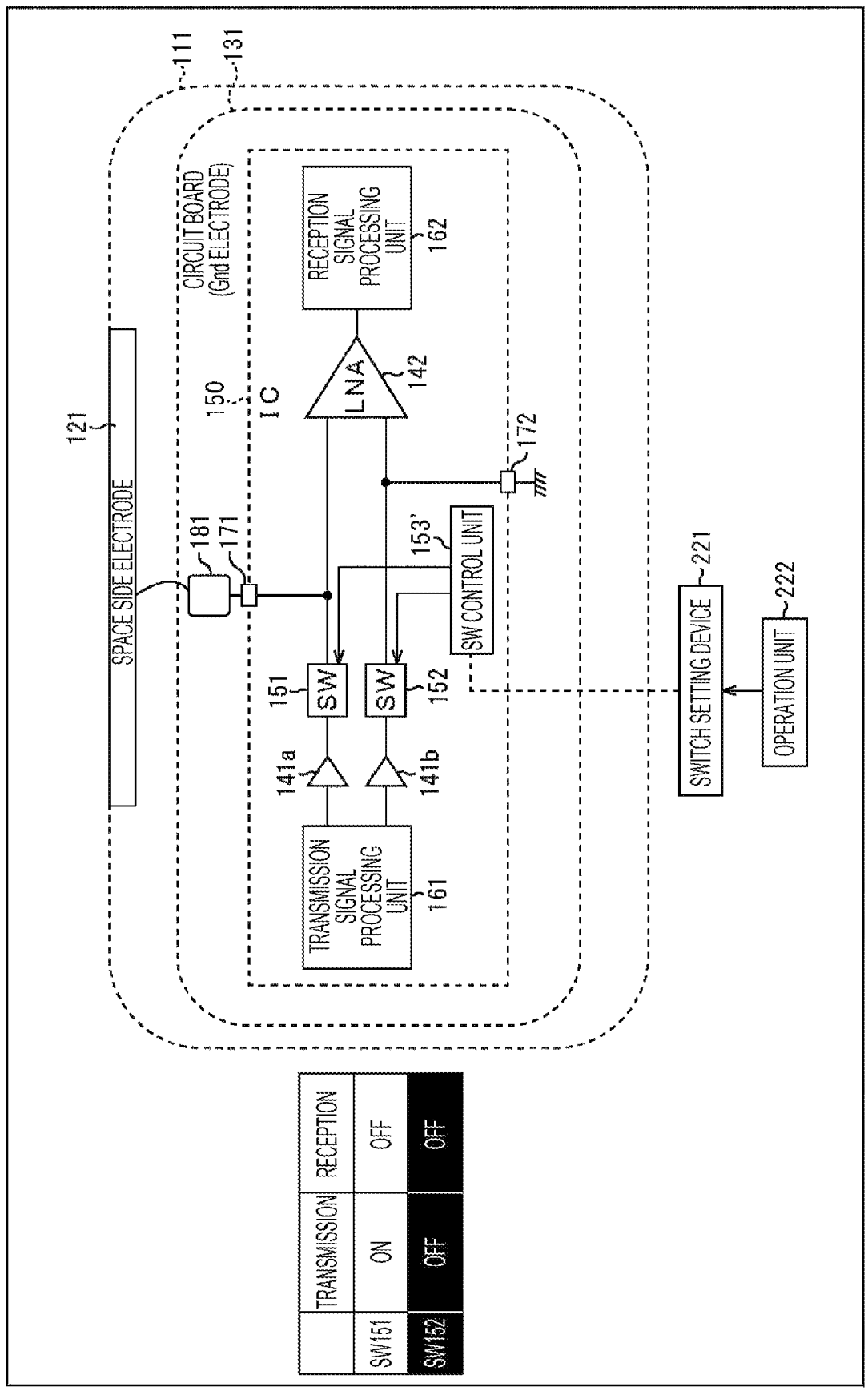
FIG. 8 is a diagram for describing a configuration example in the case of the two-pole configuration in the first embodiment of the transmission/reception device of FIG. 6.

Note that, in the configuration of the transmission/reception device 111 of FIGS. 7 and 8, constituents having the same functions as those of the transmission/reception device 111 of FIG. 5 are denoted by the same reference signs and the same names, and descriptions thereof will be omitted as appropriate.

In other words, in the transmission/reception device 111 of FIGS. 7 and 8, difference from the transmission/reception device 111 in the upper part of FIG. 5 is that a switch (SW) control unit 153 is provided.

The switch (SW) control unit 153 controls on or off of the switches (SW) 151 and 152. The switch control unit 153 autonomously operates at the time of transmission/reception operation, and as illustrated in the left part of FIG. 7, performs control to turn on the switches (SW) 151 and 152 at the time of transmission, and performs control to turn off the switches (SW) 151 and 152 at the time of reception. Thus, in the case of the three-pole configuration, the operation can be stably implemented at the time of transmission and at the time of reception.

Furthermore, in the switch control unit 153, fixed operation of the switch 152 is set by a switch setting device 221 at the time of manufacturing. In other words, the switch setting device 221 is provided outside the transmission/reception device 111, and sets the operation of the switch control unit 153 in accordance with an operation content of an operation unit 222 operated by a user at the time of manufacturing.

More specifically, the switch setting device 221 is operated by the operation unit 222, and in a case where the electrode configuration suitable for the device on which the transmission/reception device 111 is mounted is the three-pole configuration as illustrated in FIG. 7, performs setting to cause the switch control unit 153 to execute the autonomous operation as it is. In other words, as illustrated in the left part of FIG. 7, the switch setting device 221 sets the operation of the switch control unit 153 to perform control to turn on the switches (SW) 151 and 152 at the time of transmission, and to turn off the switches (SW) 151 and 152 at the time of reception.

Furthermore, the switch setting device 221 is operated by the operation unit 222, and in a case where the electrode configuration suitable for the device on which the transmission/reception device 111 is mounted is the two-pole configuration as illustrated in FIG. 8, performs setting to partially regulate the autonomous operation of the switch control unit 153 and to control the operation of the switch control unit 153 so that, as illustrated in the left part of FIG. 8, the switch (SW) 151 is controlled to be turned on at the time of transmission, the switch (SW) 151 is controlled to be turned off at the time of reception, and the switch 152 is controlled to be fixedly turned off. Note that, in the left part of FIG. 8, the settings fixedly set are displayed in white.

Note that, in the two-pole configuration of FIG. 8, the human body side electrode 122 and the terminal 182 are removed, and moreover, the connection terminal 172 is grounded.

<Switch Setting Processing by Transmission/Reception Device of FIGS. 7 and 8>

Figure 9:
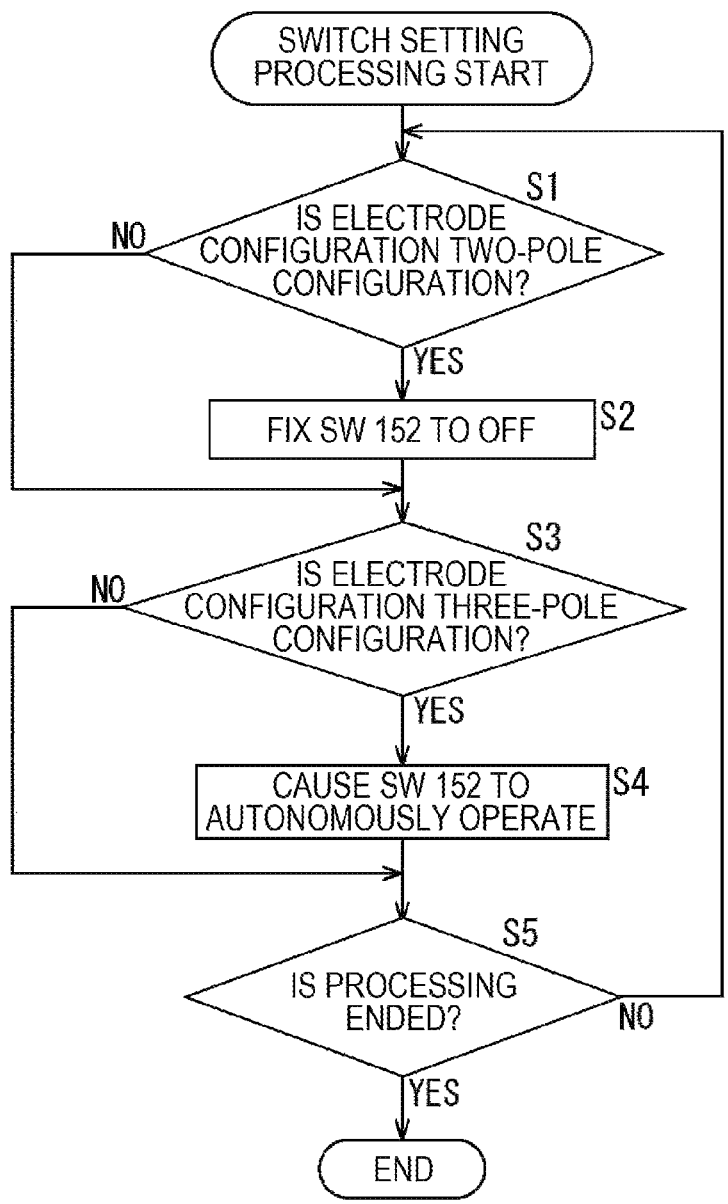
FIG. 9 is a flowchart for describing switch setting processing of the transmission/reception device of FIGS. 7 and 8.

Next, with reference to the flowchart of FIG. 9, switch setting processing will be described of the switch control unit 153 of the transmission/reception device 111 by the switch setting device 112 of FIGS. 7 and 8.

In step S1, the switch setting device 112 determines whether or not information is input by operation of the operation unit 222, the information indicating that the electrode configuration of the device on which the transmission/reception device 111 is mounted is the two-pole configuration, and in a case where the information indicating that the electrode configuration is the two-pole configuration is input, the processing proceeds to step S2.

In step S2, the operation unit 222 is operated by the user, and the switch setting device 112 sets the switch 152 fixedly in the off state in accordance with the operation content. By this processing, in the case of the two-pole configuration as illustrated in FIG. 8, the switch control unit 153, during autonomous operation, performs control to turn on the switch 151 at the time of transmission, performs control to turn off the switch 151 at the time of reception, and fixedly turns off the switch 152. In step S1, in a case where the information indicating that the electrode configuration is the two-pole configuration is not input, the processing of step S2 is skipped.

In step S3, the switch setting device 112 determines whether or not information is input by operation of the operation unit 222, the information indicating that the electrode configuration of the device on which the transmission/reception device 111 is mounted is the three-pole configuration, and in a case where the information indicating that the electrode configuration is the three-pole configuration is input, the processing proceeds to step S4.

In step S4, the operation unit 222 is operated by the user, and the switch setting device 112 performs setting to cause the switch 152 to autonomously operate in accordance with the operation content. By this processing, in the case of the three-pole configuration as illustrated in FIG. 7, the switch control unit 153 causes the switches 151 and 152 to autonomously operate. Furthermore, in a case where the information indicating that the electrode configuration is the three-pole configuration is not input in step S3, the processing of step S4 is skipped. By this processing, in the case of the three-pole configuration as illustrated in FIG. 7, the switch control unit 153 is set to operate the autonomous operation as it is, and performs control to turn on the switches 151 and 152 at the time of transmission, and performs control to turn off the switches 151 and 152 at the time of reception.

In step S5, the switch setting device 112 determines whether or not an end instruction is given by the operation unit 222, and in a case where the end instruction is not given, the processing returns to step S1, and the processing of step S1 and the subsequent steps is repeated. Then, in step S5, in a case where the end instruction is given, the processing is ended.

In other words, the switch control unit 153 can be switched and set to either the two-pole configuration or the three-pole configuration until the end instruction is given.

<Switch Control Processing>

Figure 10:
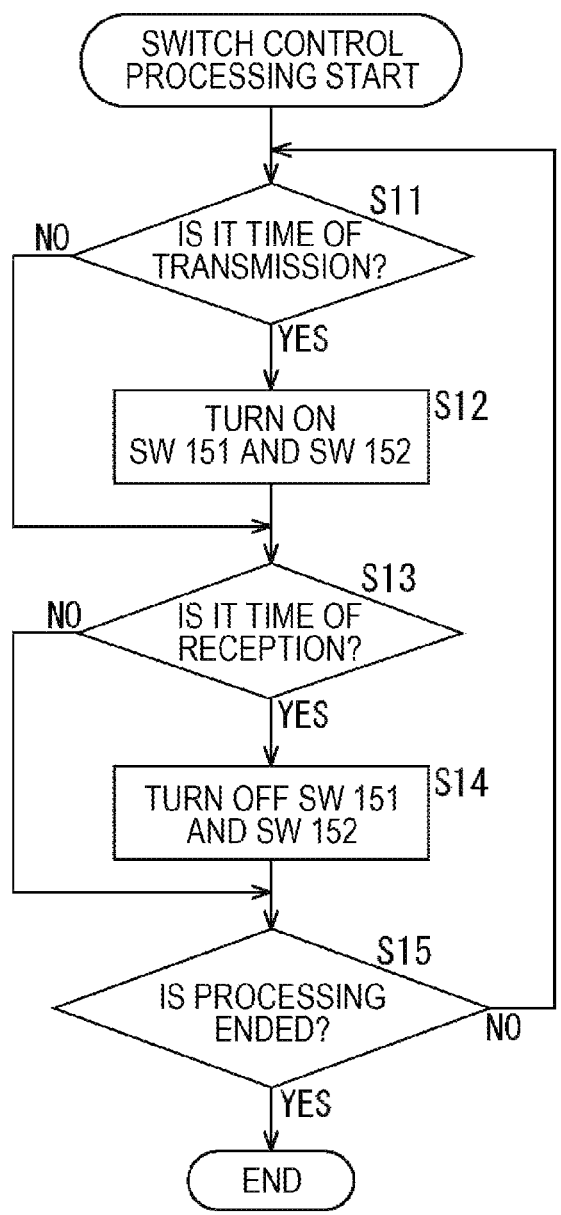
FIG. 10 is a flowchart for describing switch control processing of the transmission/reception device of FIGS. 7 and 8.

Next, with reference to the flowchart of FIG. 10, the switch control processing will be described that is the autonomous operation by the switch control unit 153.

In step S11, the switch control unit 153 determines whether or not it is the time of transmission, and in a case where it is the time of transmission, the processing proceeds to step S12.

In step S12, the switch control unit 153 performs control to turn on the switches 151 and 152. Note that, in step S11, in a case where it is determined that it is not the time of transmission, the processing in step S12 is skipped.

In step S13, the switch control unit 153 determines whether or not it is the time of reception, and in a case where it is the time of reception, the processing proceeds to step S14.

In step S14, the switch control unit 153 performs control to turn off the switches 151 and 152. Note that, in step S13, in a case where it is determined that it is not the time of reception, the processing in step S13 is skipped.

In step S15, the switch control unit 153 determines whether or not the operation is ended, and in a case where the operation is not ended, the processing returns to step S11, and the processing of step S11 and the subsequent steps is repeated. In other words, operations of the switches 151 and 152 are controlled so that optimum states are obtained respectively for the time of transmission and the time of reception. Then, in a case where an operation end instruction is given in step S15, the operation is ended.

With the above operation, in the case of the three-pole configuration, the operations of the switches 151 and 152 are controlled to be appropriate states respectively for the time of transmission and the time of reception, by the autonomous operation of the switch control unit 153. However, in the case of the two-pole configuration, operation of the switch 152 is regulated fixedly in the off state by the above-described switch setting processing, so that, by the autonomous operation of the switch control unit 153, only operation of the switch 151 is controlled, and the switch is controlled to be turned on at the time of transmission, and controlled to be turned off at the time of reception.

In other words, in the case of the three-pole configuration due to the switch setting processing at the time of manufacturing, the operations of the switches 151 and 152 are controlled by the autonomous operation in the switch control processing, and the switches are turned on at the time of transmission, and turned off at the time of reception. Furthermore, in the case of the two-pole configuration due to the switch setting processing at the time of manufacturing, the operation of the switch 152 is regulated and fixedly turned off, and only the operation of the switch 151 is controlled by the autonomous operation in the switch control processing, and the switch is turned on at the time of transmission, and turned off at the time of reception.

As a result, it is possible to switch and use the electrode configuration of the same transmission/reception device 111 depending on a required electrode configuration.

<Second Embodiment>

In the above, an example has been described in which, in the two-pole configuration, the human body side electrode 122 and the terminal 182 are removed, and moreover, the connection terminal 172 is grounded; however, depending on the electrode configuration, the connection terminal 172 may be switched to the ground potential by a switch, in the case of the two-pole configuration.

Figure 11:
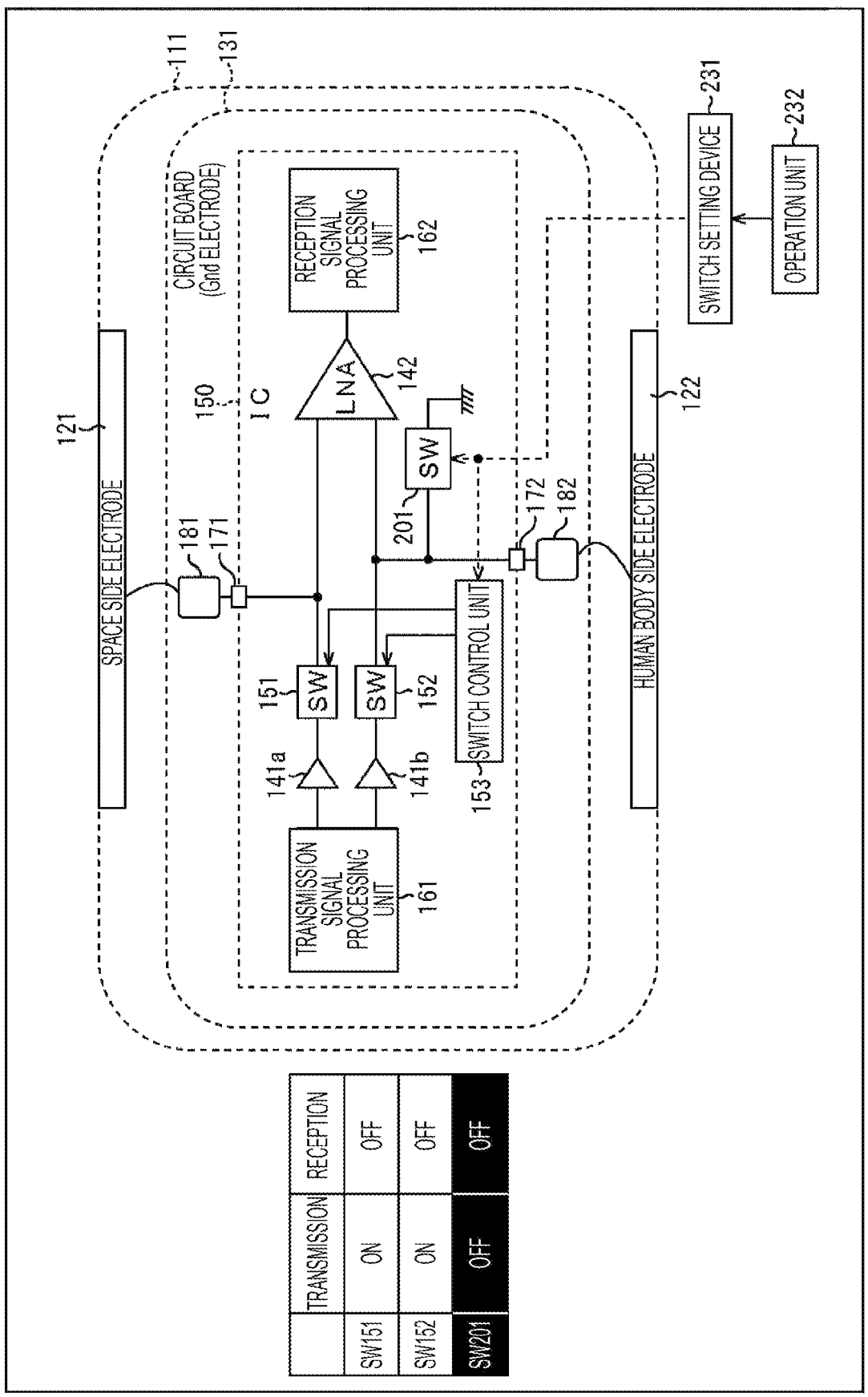
FIG. 11 is a diagram for describing a configuration example in the case of the three-pole configuration in a second embodiment of the transmission/reception device of FIG. 6.
Figure 12:
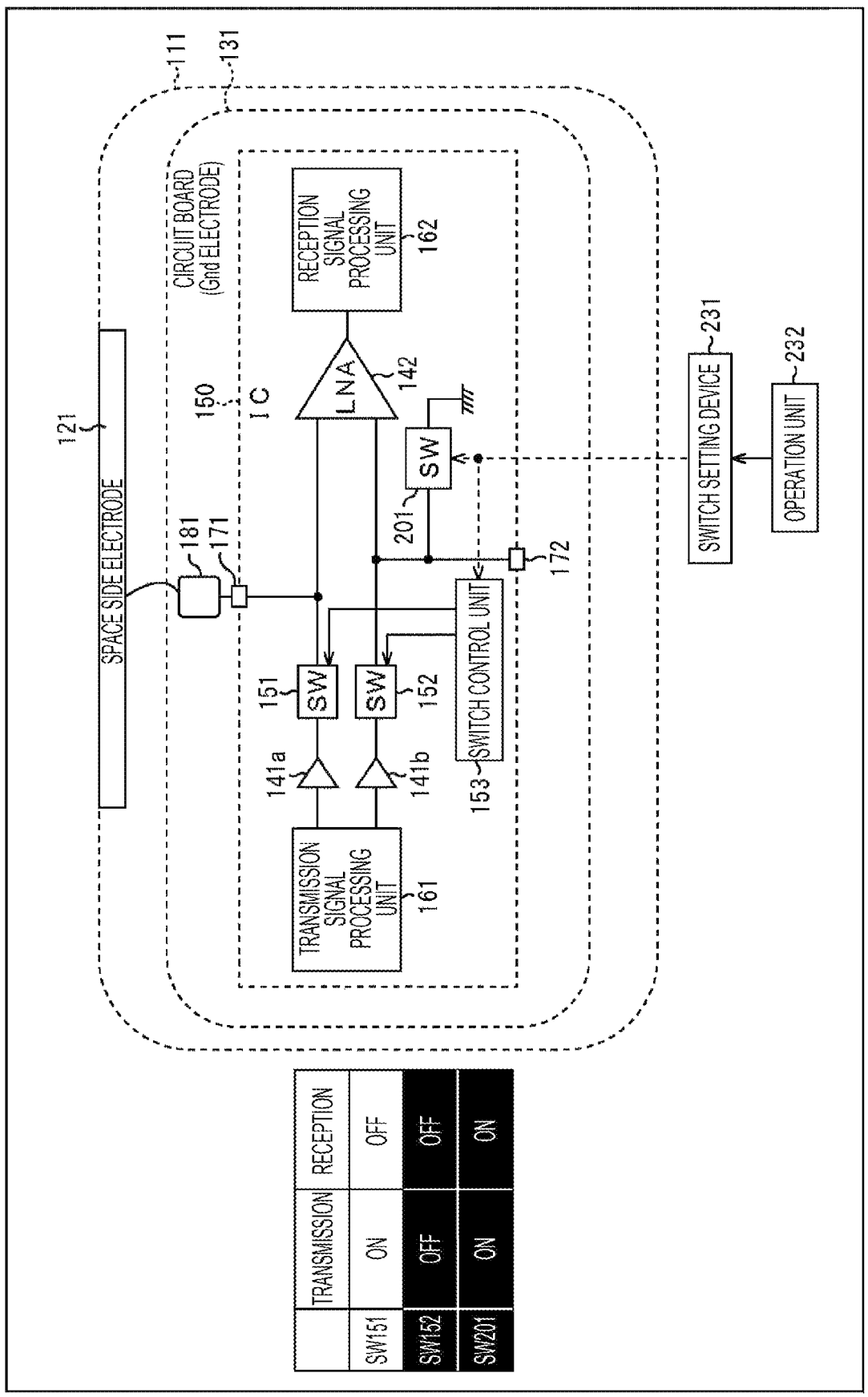
FIG. 12 is a diagram for describing a configuration example in the case of the two-pole configuration in the second embodiment of the transmission/reception device of FIG. 6.

FIGS. 11 and 12 each illustrate a configuration example of the transmission/reception device 111 in which the connection terminal 172 can be switched to the ground potential by the switch in the case of the two-pole configuration depending on the electrode configuration. Note that, in the configuration of the transmission/reception device 111 of FIGS. 11 and 12, the same constituents having the same functions as those of the transmission/reception device 111 of FIGS. 7 and 8 are denoted by the same reference signs and the same names, and descriptions thereof will be omitted as appropriate.

In other words, in the transmission/reception device 111 of FIGS. 11 and 12, difference from the transmission/reception device 111 of FIGS. 7 and 8 is that a wiring line connected to the connection terminal 172 is grounded via a switch 201, and a switch setting device 231 and an operation unit 232 are provided in place of the switch setting device 112 and the operation unit 222.

In other words, as illustrated in FIG. 11, in the three-pole configuration, the switch 201 is controlled to be turned off fixedly by the switch setting device 231, whereby the connection terminal 172 is set to the same potential as the human body side electrode 122. Furthermore, as illustrated in FIG. 12, in the two-pole configuration, the switch 201 is controlled to be turned on fixedly by the switch setting device 231, whereby the connection terminal 172 is set to the ground potential. Note that, the switch setting device 231 executes the switch setting processing of the switch control unit 153 similarly to the switch setting device 112; however, the processing is similar to the above-described processing, so that the description will be omitted.

<Switch Setting Processing by Transmission/Reception Device of FIGS. 11 and 12>

Figure 13:
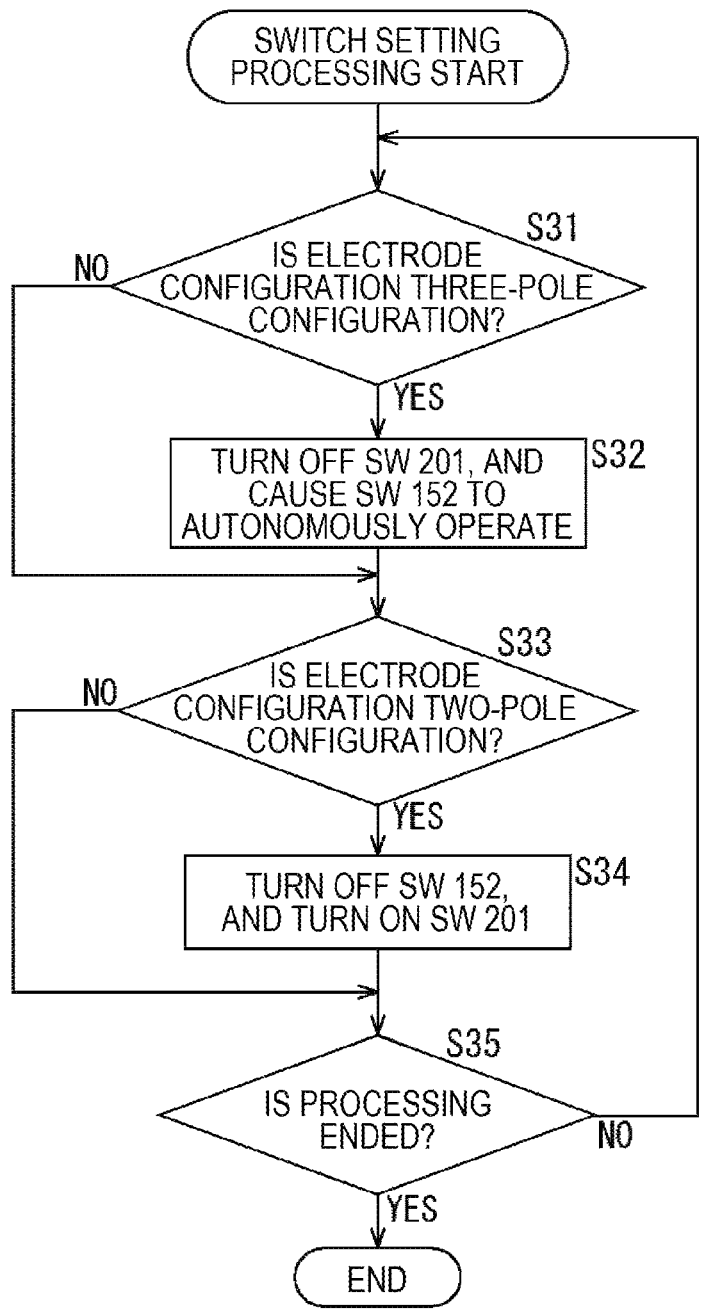
FIG. 13 is a flowchart for describing switch control processing of the transmission/reception device of FIGS. 11 and 12.

Next, with reference to the flowchart of FIG. 13, switch setting processing will be described of the switch control unit 231 of the transmission/reception device 111 of FIGS. 11 and 12.

In step S31, the switch setting device 231 determines whether or not information is input by operation of the operation unit 232, the information indicating that the electrode configuration of the device on which the transmission/reception device 111 is mounted is the three-pole configuration, and in a case where the information indicating that the electrode configuration is the three-pole configuration is input, the processing proceeds to step S32.

In step S32, the operation unit 222 is operated by the user, and the switch setting device 231 sets the switch 201 fixedly in the off state in accordance with the operation content. Furthermore, the switch control unit 231 performs setting to cancel the fixed off of the switch 152 and to cause the switch 152 to autonomously operate by controlling the switch control unit 153. By this processing, as illustrated in FIG. 11, the connection terminal 172 is set in a state of the same potential as the human body side electrode 122, and the electrode configuration is set to the three-pole configuration. Note that, in step S31, in a case where the electrode configuration is not the three-pole configuration, the processing of step S32 is skipped.

In step S33, the switch setting device 231 determines whether or not information is input by operation of the operation unit 232, the information indicating that the electrode configuration of the device on which the transmission/reception device 111 is mounted is the two-pole configuration, and in a case where the information indicating that the electrode configuration is the two-pole configuration is input, the processing proceeds to step S34.

In step S34, the operation unit 232 is operated by the user, and the switch setting device 231 sets the switch 201 fixedly in the on state in accordance with the operation content. Furthermore, the switch control unit 231 performs setting to fixedly turn on the switch 152 by controlling the switch control unit 153. By this processing, as illustrated in FIG. 12, the connection terminal 172 is set to the ground potential, and the electrode configuration is set to the two-pole configuration.

In step S35, the switch setting device 231 determines whether or not an end instruction is given by the operation unit 232, and in a case where the end instruction is not given, the processing returns to step S31, and the processing of step S31 and the subsequent steps is repeated. Then, in step S35, in a case where the end instruction is given, the processing is ended.

In other words, the switch control unit 201 can be switched and set to either the two-pole configuration or the three-pole configuration until the end instruction is given at the time of manufacturing and the like.

By the above processing, labor can be omitted to set the connection terminal 172 to the ground potential in changing from the three-pole configuration to the two-pole configuration.

<Modification of Second Embodiment>

In the above, an example has been described in which it is enabled to switch the connection terminal 172 to one of a potential equal to the human body side electrode 122 and the ground potential, by the switch, depending on the electrode configuration, depending on the electrode configuration. However, a switch may be provided, on a wiring line between the connection terminal 172 and the reception input amplifier 142, for switching whether the reception input amplifier 142 and the connection terminal 172 are connected to each other or the reception input amplifier 142 is grounded.

Figure 14:
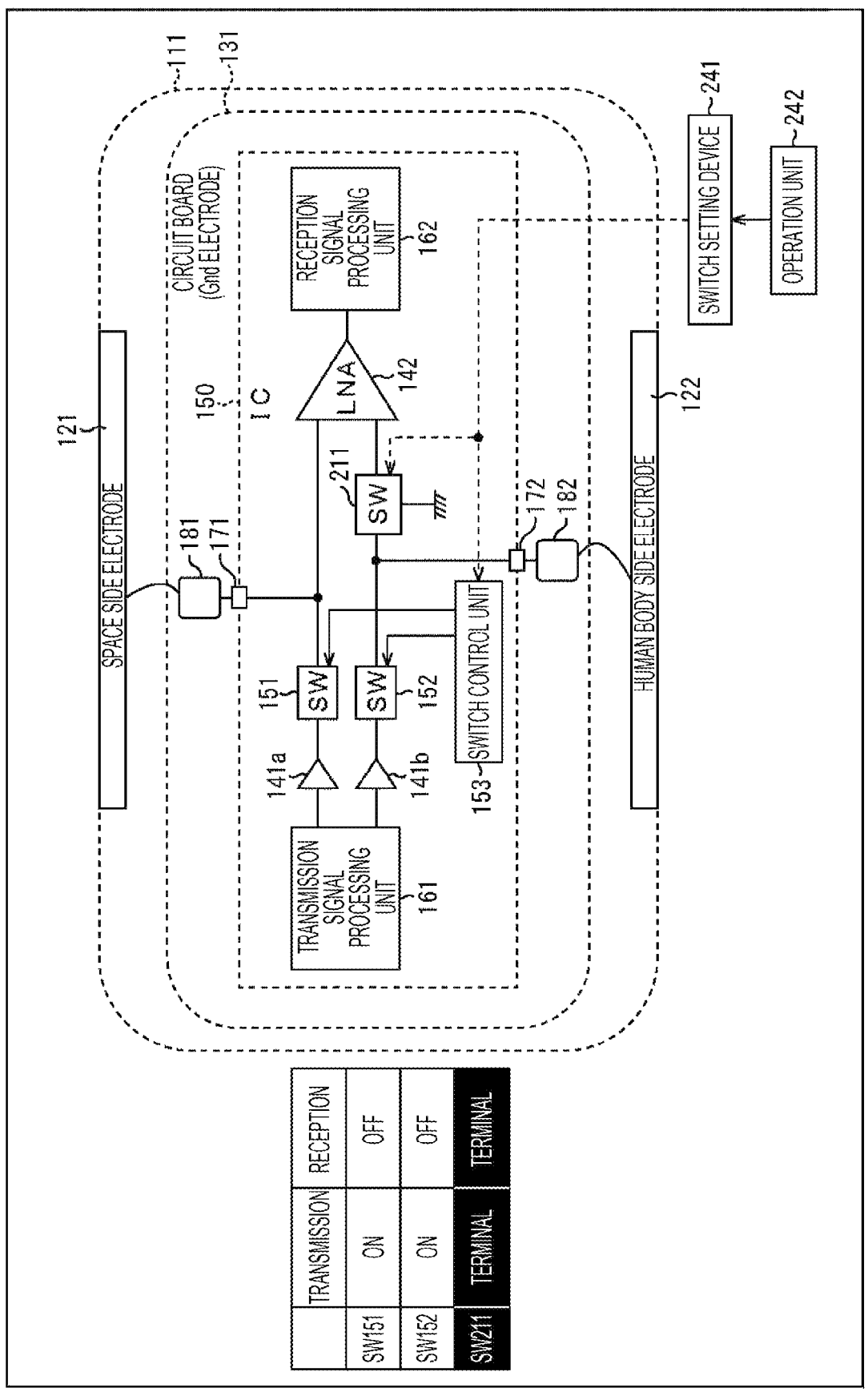
FIG. 14 is a diagram for describing a configuration example in the case of the three-pole configuration in a modification of the second embodiment of the transmission/reception device of FIG. 6.
Figure 15:
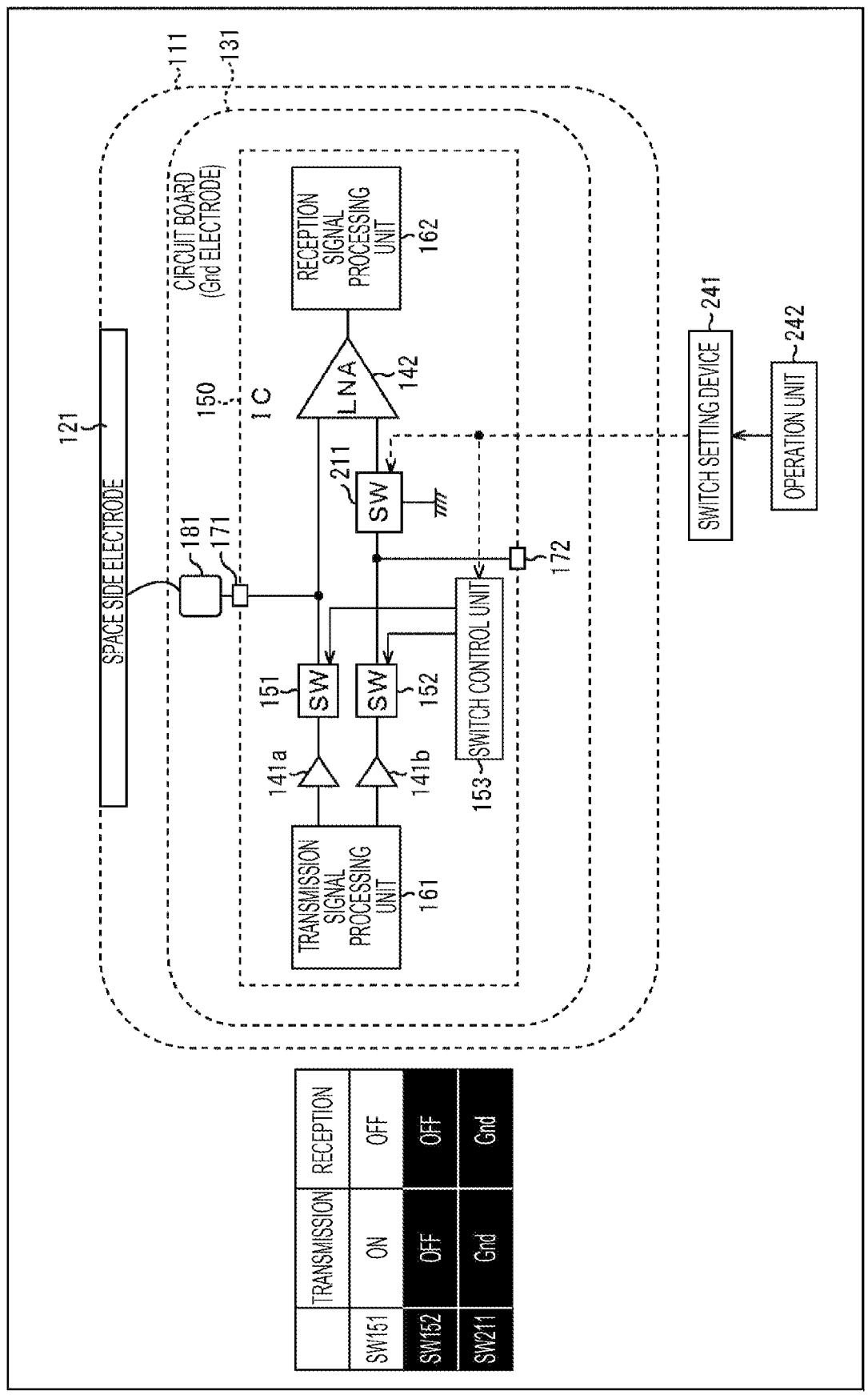
FIG. 15 is a diagram for describing a configuration example in the case of the two-pole configuration in the modification of the second embodiment of the transmission/reception device of FIG. 6.

FIGS. 14 and 15 each illustrate a configuration example of the transmission/reception device 111 in which the switch is provided, on the wiring line between the connection terminal 172 and the reception input amplifier 142, for switching whether the reception input amplifier 142 and the connection terminal 172 are connected to each other or the reception input amplifier 142 is grounded depending on the electrode configuration. Note that, in the configuration of the transmission/reception device 111 of FIGS. 14 and 15, the same constituents having the same functions as those of the transmission/reception device 111 of FIGS. 11 and 12 are denoted by the same reference signs and the same names, and descriptions thereof will be omitted as appropriate.

In other words, in the transmission/reception device 111 of FIGS. 14 and 15, difference from the transmission/reception device 111 of FIGS. 11 and 12 is that a switch 211 is provided, on the wiring line connecting the reception input amplifier 142 to the connection terminal 172, for switching whether the reception input amplifier 142 and the connection terminal 172 are connected to each other or the reception input amplifier 142 is grounded, and a switch setting device 241 and an operation unit 242 are provided in place of the switch setting device 231 and the operation unit 231.

In other words, as illustrated in FIG. 14, in the three-pole configuration, the switch 211 is controlled by the switch setting device 241 to connect the reception input amplifier 142 and the connection terminal 172 fixedly to each other, whereby the connection terminal 172 is set to the same potential as the human body side electrode 122. Furthermore, as illustrated in FIG. 15, in the two-pole configuration, the switch setting device 241 causes the switch 211 to ground the reception input amplifier 142 fixedly, whereby the reception input amplifier 142 is set to the ground potential.

<Switch Setting Processing by Transmission/Reception Device of FIGS. 14 and 15>

Figure 16:
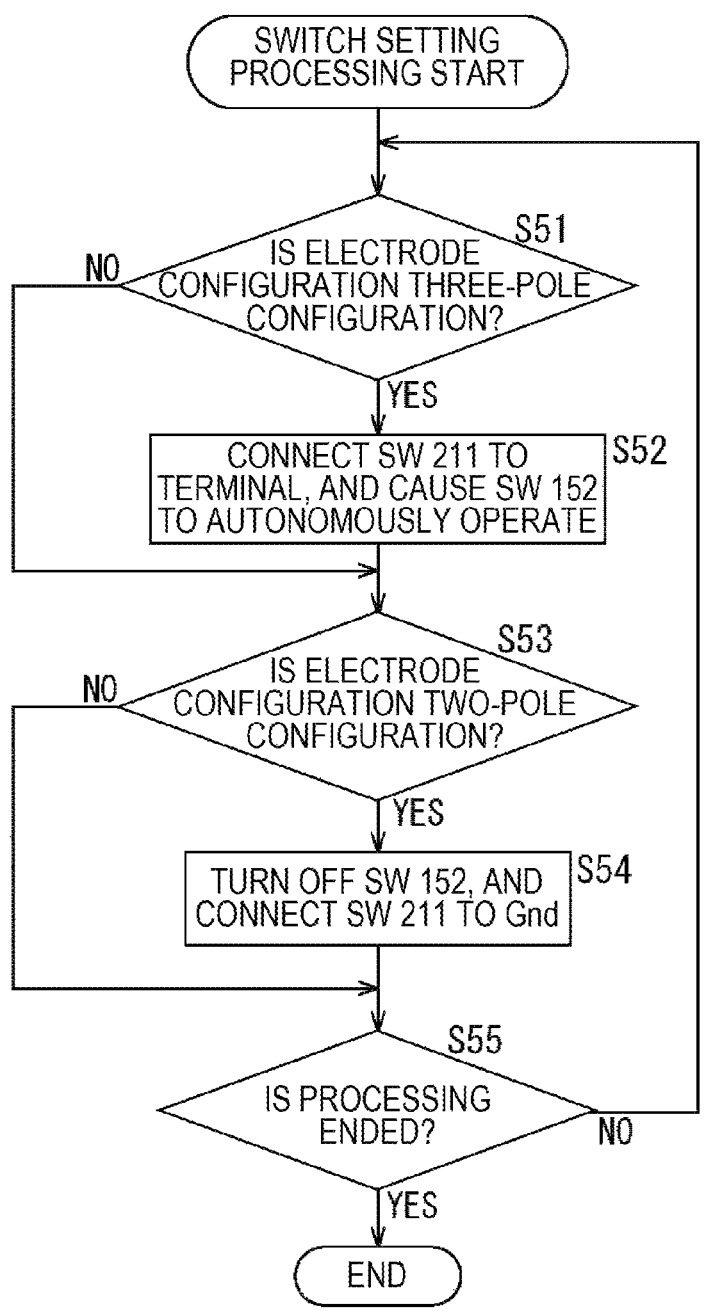
FIG. 16 is a flowchart for describing switch control processing of the transmission/reception device of FIGS. 14 and 15.

Next, with reference to the flowchart of FIG. 16, the switch setting processing will be described of the switch control unit 241 of the transmission/reception device 111 of FIGS. 14 and 15.

In step S51, the switch setting device 241 determines whether or not information is input by operation of the operation unit 242, the information indicating that the electrode configuration of the device on which the transmission/reception device 111 is mounted is the three-pole configuration, and in a case where the information indicating that the electrode configuration is the three-pole configuration is input, the processing proceeds to step S52.

In step S52, the operation unit 242 is operated by the user, and in accordance with the operation content, the switch setting device 241 sets the switch 211 fixedly to connect the reception input amplifier 142 and the connection terminal 172 to each other. Furthermore, the switch control unit 241 performs setting to cancel the fixed off of the switch 152 and to cause the switch 152 autonomously operate by controlling the switch control unit 153. By this processing, in the case of the three-pole configuration as illustrated in FIG. 14, the reception input amplifier 142 is set in the state of the same potential as the human body side electrode 122, and the electrode configuration is set to the three-pole configuration. Note that, in step S51, in a case where the electrode configuration is not the three-pole configuration, the processing of step S52 is skipped.

In step S53, the switch setting device 241 determines whether or not information is input by operation of the operation unit 242, the information indicating that the electrode configuration of the device on which the transmission/reception device 111 is mounted is the two-pole configuration, and in a case where the information indicating that the electrode configuration is the two-pole configuration is input, the processing proceeds to step S54.

In step S54, the operation unit 242 is operated by the user, and the switch setting device 241 performs setting to cause the switch 211 to ground the reception input amplifier 142 fixedly in accordance with the operation content. Furthermore, the switch control unit 241 performs setting to fixedly turn off the switch 152 by controlling the switch control unit 153. By this processing, in the case of the two-pole configuration as illustrated in FIG. 15, the reception input amplifier 142 is set to the ground potential, and the electrode configuration is set to the two-pole configuration.

In step S55, the switch setting device 241 determines whether or not an end instruction is given by the operation unit 242, and in a case where the end instruction is not given, the processing returns to step S51, and the processing of step S51 and the subsequent steps is repeated. Then, in step S55, in a case where the end instruction is given, the processing is ended.

In other words, the switch control unit 211 can be switched and set to either the two-pole configuration or the three-pole configuration until the end instruction is given.

By the above processing, labor can be omitted to set the connection terminal 172 to the ground potential in changing from the three-pole configuration to the two-pole configuration.

<Third Embodiment>

In the above, a configuration example has been described of the wristband type transmission/reception device described with reference to FIG. 6; however, the transmission/reception device may be a so-called smartphone type, and the smartphone type transmission/reception device is set as the two-pole configuration, and moreover, a device called a jacket incorporating the human body side electrode 122 may be attached to the smartphone type transmission/reception device to set the electrode configuration to the three-pole configuration.

Figure 17:
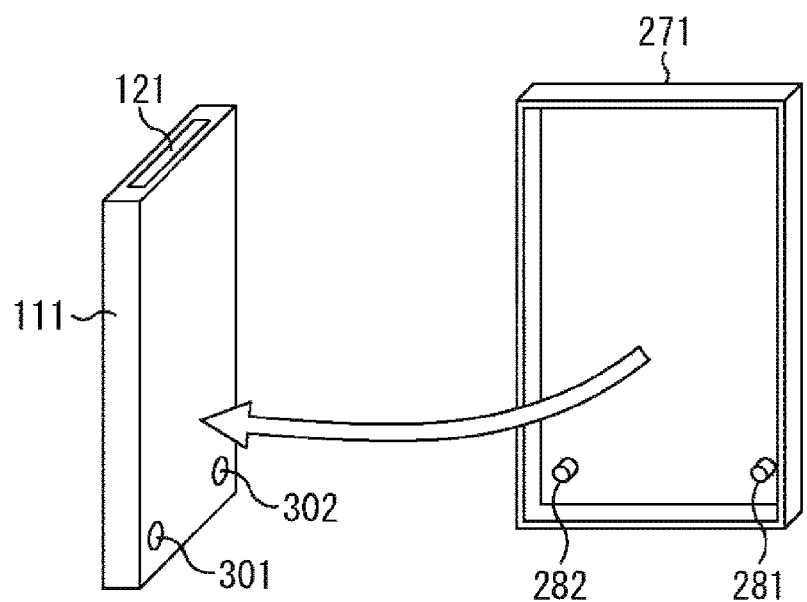
FIG. 17 is an exterior perspective view for describing an exterior of a transmission/reception device of a third embodiment of the present disclosure.

FIG. 17 illustrates an exterior configuration example of a smartphone type transmission/reception device 111.

A touch screen, operation buttons, and the like (not illustrated) are provided on a front surface portion 111a of the smartphone type transmission/reception device 111. Furthermore, a back surface portion 111b of the transmission/reception device 111 is provided with hole shaped terminals 301 and 302 for making connection by respectively inserting protruding terminals 281 and 282, the protruding terminal 281 serving also as a wiring line electrically connected to the human body side electrode 122 provided on a box type jacket 271 at a lower part in the figure, the protruding terminal 282 indicating that the jacket 271 is united to the smartphone type transmission/reception device 111. The smartphone type transmission/reception device 111 is provided with the space side electrode 121 at the top end portion.

The jacket 271 is a box-like one incorporating the human body side electrode 122, and is attached to the smartphone type transmission/reception device 111 to cover the entire back surface portion 111b of the smartphone type transmission/reception device 111 and to enclose the transmission/reception device 111. At this time, the above-described protruding terminals 281 and 282 are respectively inserted into the hole shaped terminals 301 and 302, and the connection is made. Furthermore, the human body side electrode 122 incorporated in the jacket 271 is configured not to cover the space side electrode 121 provided on the upper surface portion of the transmission/reception device 111, and with this configuration, the space side electrode 121 and the human body side electrode 122 do not interfere with each other even in a state where the jacket 271 is attached to the transmission/reception device 111.

When the jacket 271 is attached to the transmission/reception device 111, the back surface portion 111b is covered by the jacket 271, and the user grips the transmission/reception device 111 via the jacket 271. As a result, the jacket 271 functions as the human body side electrode 122.

<Configuration Example of Transmission/Reception Device of FIG. 17>

Next, with reference to the block diagrams of FIGS. 18 and 19, a configuration example will be described of the transmission/reception device 111 of FIG. 17.

Figure 18:
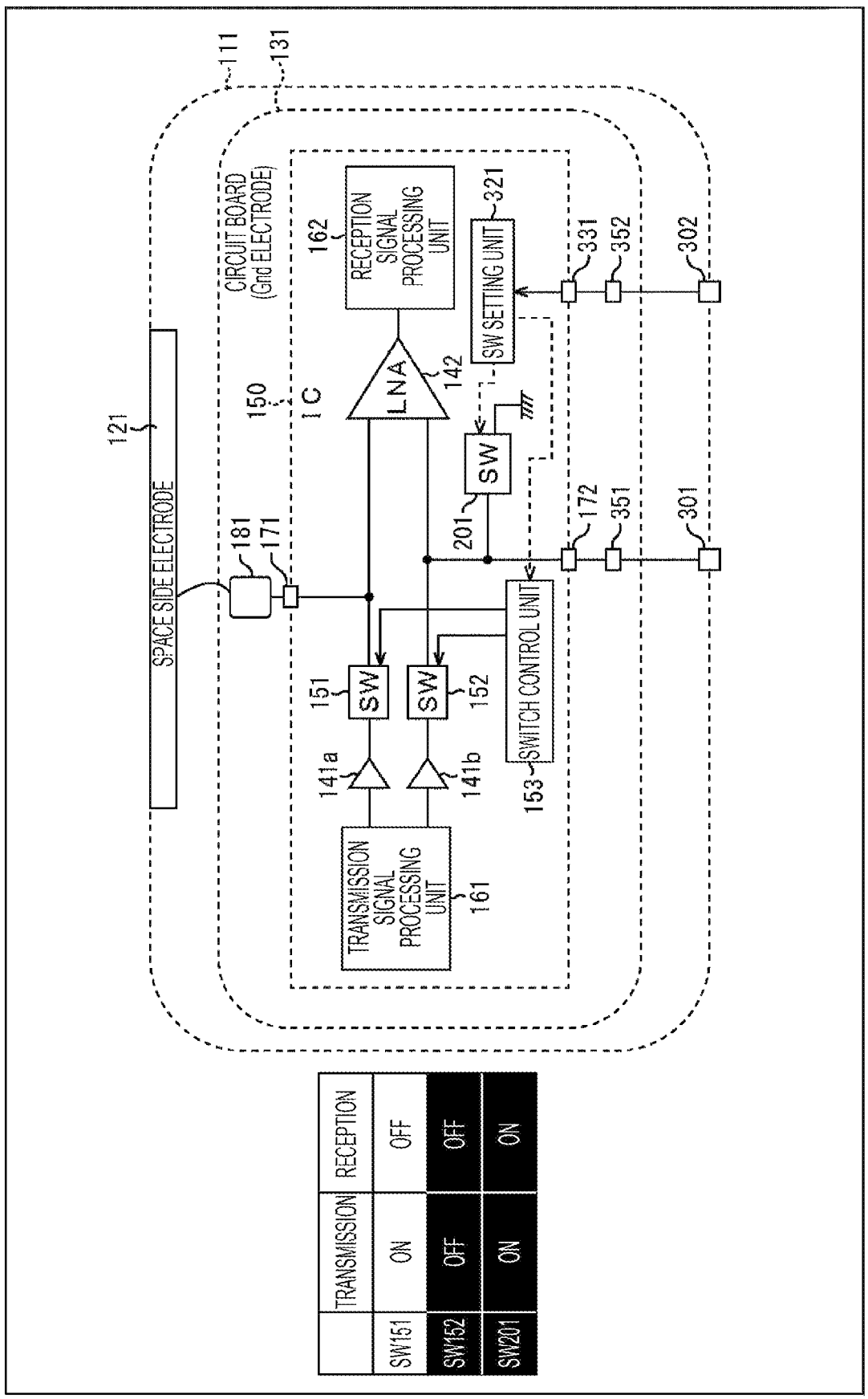
FIG. 18 is a diagram for describing a configuration example in the case of the three-pole configuration in the third embodiment of the transmission/reception device of FIG. 17.
Figure 19:
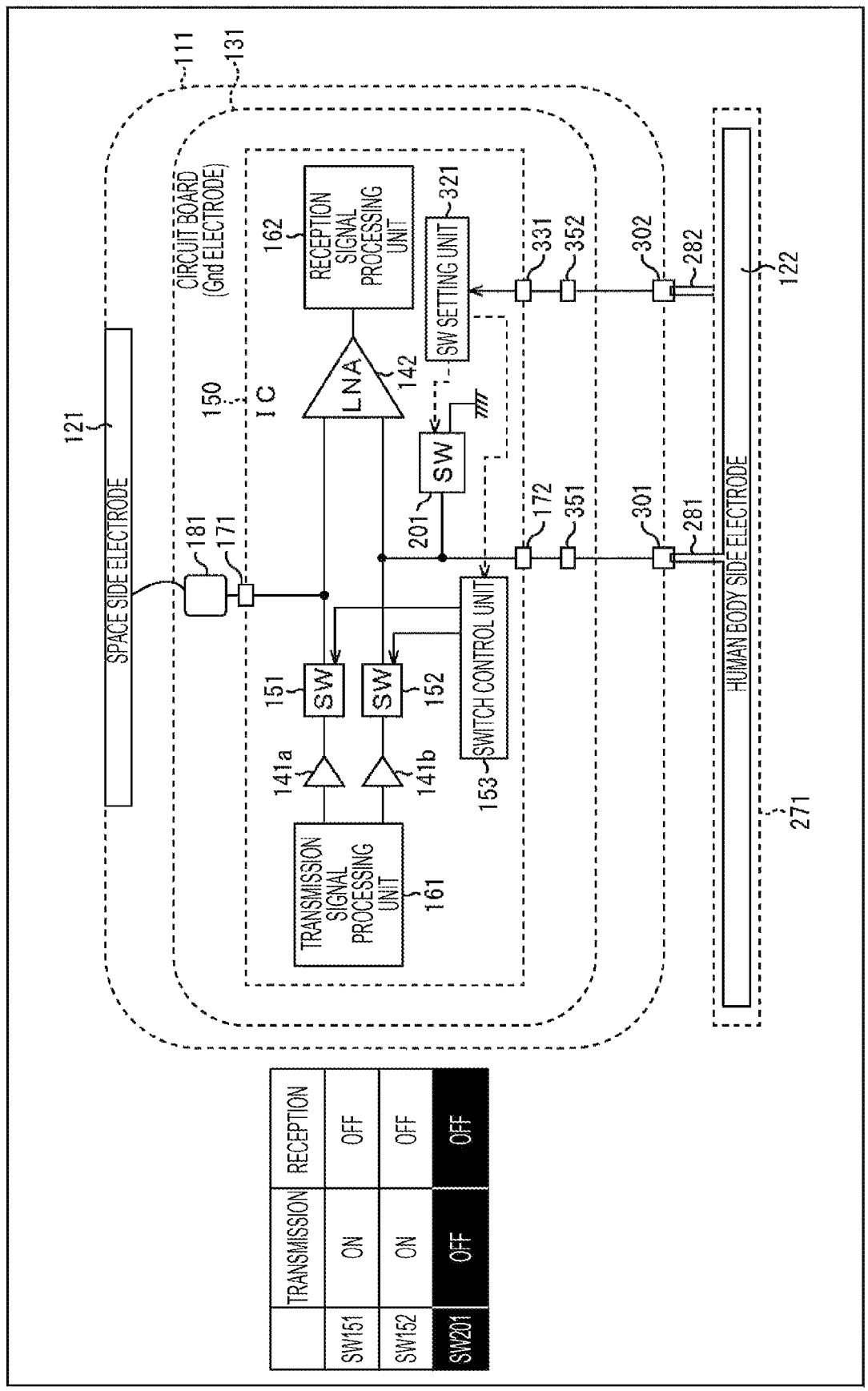
FIG. 19 is a diagram for describing a configuration example in the case of the two-pole configuration in the third embodiment of the transmission/reception device of FIG. 17.

In the configuration of the transmission/reception device 111 of FIGS. 18 and 19, constituents having the same functions as those in the transmission/reception device 111 of FIGS. 11 and 12 are denoted by the same reference signs and the same names, and descriptions thereof will be omitted as appropriate.

In other words, in the transmission/reception device 111 of FIGS. 18 and 19, difference from the transmission/reception device 111 of FIGS. 11 and 12 is that a switch (SW) setting unit 321 is provided in place of the transmission/reception setting device 231 and the operation unit 232, and that a terminal 351 on the circuit board 131 and the hole shaped terminal 301 are provided for the connection terminal 172 to be electrically connected to the human body side electrode 122, and a connection terminal 331, a terminal 352 on the circuit board 131, and the hole shaped terminal 302 are provided for the switch setting unit 321 to be connected to the terminal 281 of the jacket 271.

The switch setting unit 321 determines whether or not the jacket 271 is connected to the switch setting unit 321 via the terminal 282 when the jacket 271 is attached to the smartphone type transmission/reception device 111, and sets the switch 201 to on or off depending on the determination result.

More specifically, as illustrated in FIG. 18, when it is recognized that the terminal 282 is not connected to the switch setting unit 321 via the terminal 331, the switch setting unit 321 regards that the jacket 271 is not attached to the transmission/reception device 111, and recognizes that the electrode configuration is the two-pole configuration as a whole. At this time, the switch setting unit 321 sets the switch 201 to on.

Furthermore, as illustrated in FIG. 19, when it is recognized that the terminal 282 is connected to the setting unit 321 via the terminal 331, the switch setting unit 321 regards that the terminal 281 of the human body side electrode 122 incorporated in the jacket 271 and the terminal 301 are connected to each other and the jacket 271 is attached to the transmission/reception device 111, and recognizes that the electrode configuration is the three-pole configuration as a whole. At this time, the switch setting unit 321 performs control to turn off the switch 201. Moreover, the switch setting unit 321 performs setting to fixedly turn off the switch 153 when the electrode configuration is the two-pole configuration.

<Switch Setting Processing by Transmission/Reception Device of FIGS. 18 and 19>

Figure 20:
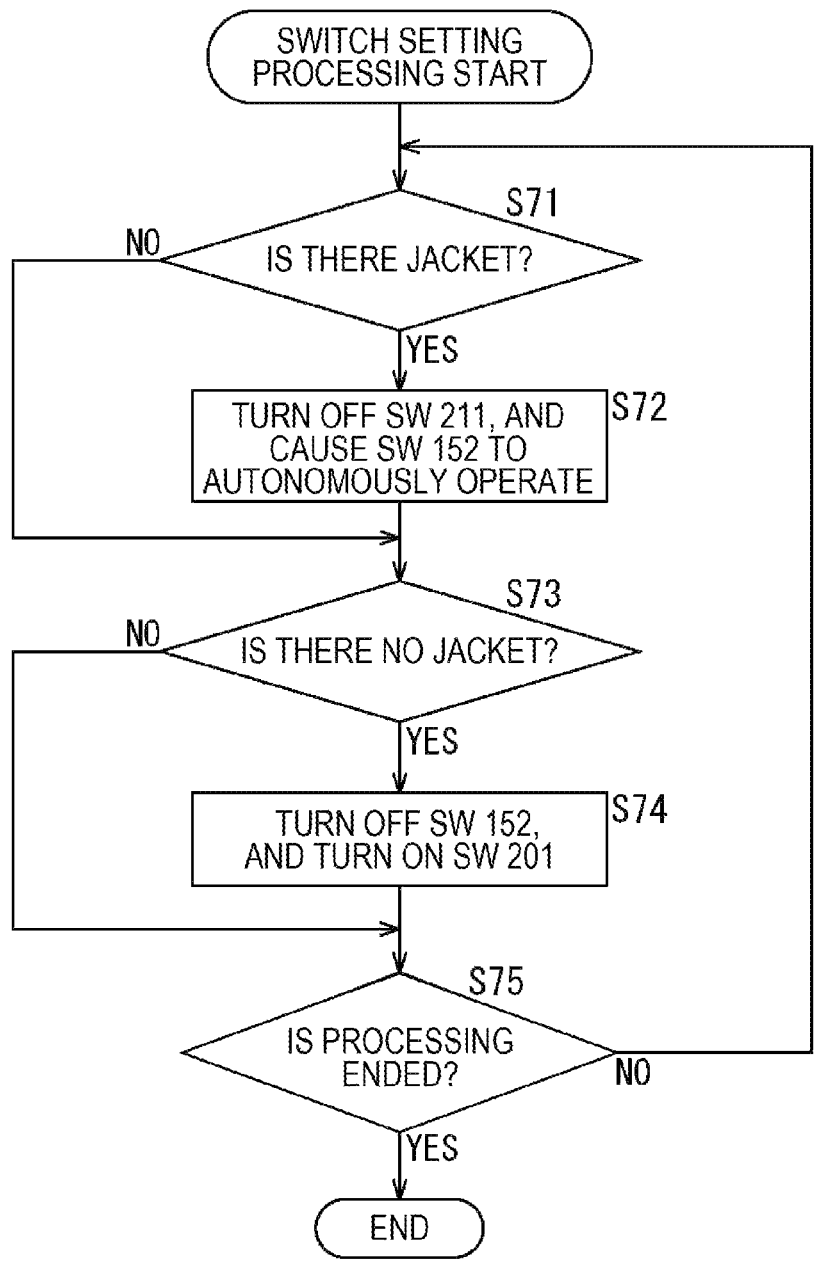
FIG. 20 is a flowchart for describing switch control processing of the transmission/reception device of FIGS. 18 and 19.

Next, with reference to the flowchart of FIG. 20, the switch setting processing will be described of the switch setting unit 321 of the transmission/reception device 111 of FIGS. 18 and 19.

In step S71, the switch setting unit 321 determines whether or not the terminal 331 is connected to the terminal 282, thereby determining whether or not the terminal 281 of the jacket 271 incorporating the human body side electrode 122 is connected to the terminal 301 and the electrode configuration is the three-pole configuration. In step S71, in a case where it is determined that the electrode configuration is the three-pole configuration, the processing proceeds to step S72.

In step S72, the switch setting unit 321 sets the switch 201 fixedly in the off state. Furthermore, the switch setting unit 321 performs setting to fixedly turn off the switch 152 by controlling the switch control unit 153. By this processing, in the case of the three-pole configuration in which the jacket 271 is attached to the transmission/reception device 111 as illustrated in FIG. 18, the connection terminal 172 is set in the state of the same potential as the human body side electrode 122, and the electrode configuration is set to the three-pole configuration. Note that, in step S71, in a case where the electrode configuration is not the three-pole configuration, the processing of step S72 is skipped.

In step S73, the switch setting unit 321 determines whether or not the terminal 321 is connected to the terminal 282, thereby determining whether or not the terminal 281 of the jacket 271 incorporating the human body side electrode 122 is not connected to the terminal 301 and the electrode configuration is the two-pole configuration. In step S73, in a case where it is determined that the electrode configuration is the two-pole configuration, the processing proceeds to step S74.

In step S74, the switch setting unit 321 sets the switch 201 fixedly in the on state. Furthermore, the switch setting unit 321 performs setting to cancel the fixed off of the switch 152 and to cause the switch 152 to autonomously operate by controlling the switch control unit 153. By this processing, in the case of the two-pole configuration in which the jacket 271 is not attached to the transmission/reception device 111 as illustrated in FIG. 19, the connection terminal 172 is set in the state of the ground potential, and the electrode configuration is set to the two-pole configuration. Note that, in step S73, in a case where the electrode configuration is not the two-pole configuration, the processing of step S74 is skipped.

In step S75, the switch setting unit 321 determines whether or not an end instruction is given, and in a case where the end instruction is not given, the processing returns to step S71, and the processing of step S71 and the subsequent steps is repeated. Then, in step S75, in a case where the end instruction is given, the processing is ended.

By the above processing, it is possible to determine whether the electric configuration is the three-pole configuration or the two-pole configuration depending on whether or not the jacket 271 is attached to the smartphone type transmission/reception device 111, and the electrode configurations can be switched and used. Furthermore, as a result, by attaching the jacket 271, the electrode configuration is set to the three-pole configuration, and the sensitivity at the time of transmission processing can be improved to about twice.

<Modification of Third Embodiment>

Figure 21:
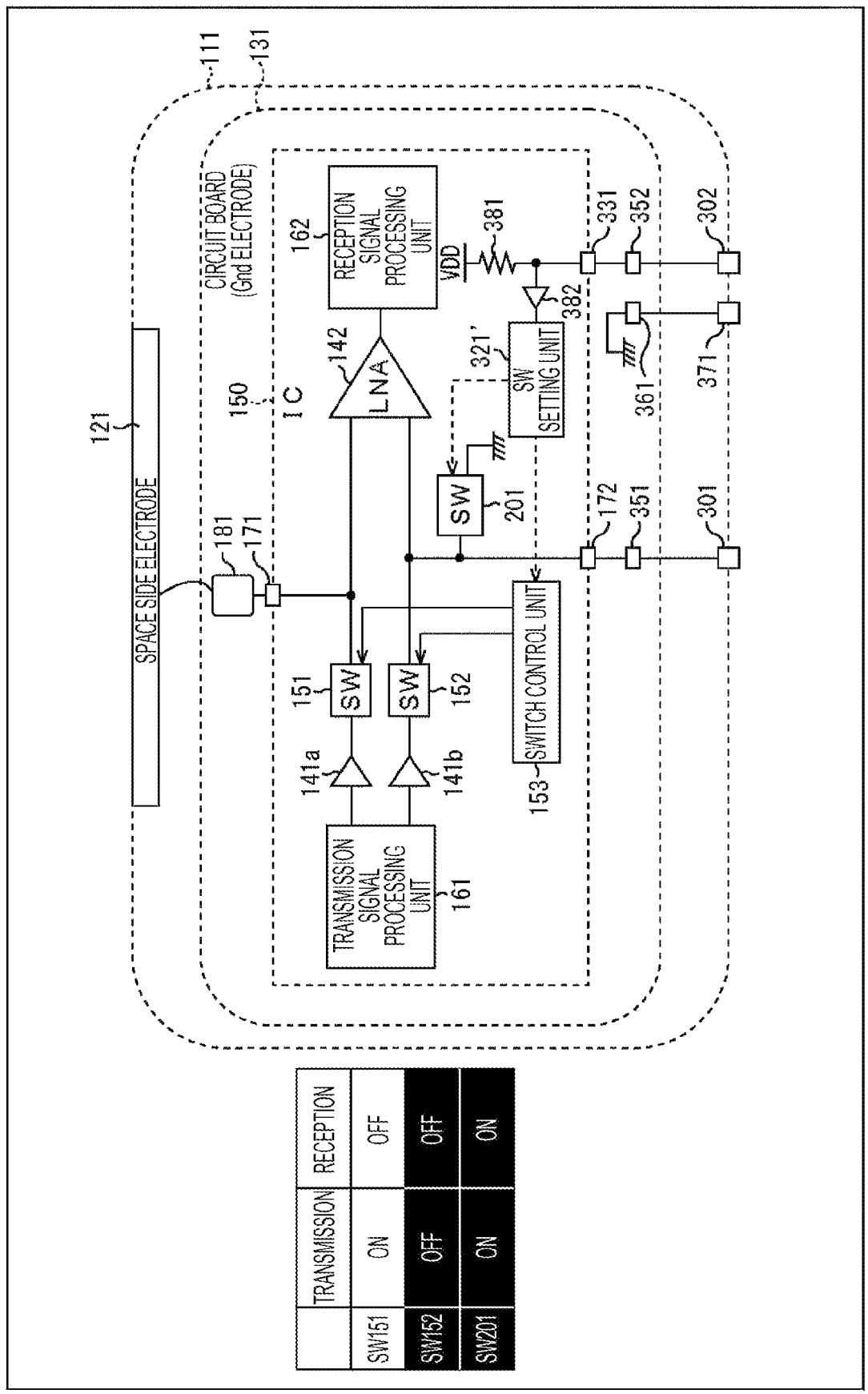
FIG. 21 is a diagram for describing a configuration example in the case of the three-pole configuration in a modification of the third embodiment of the transmission/reception device of FIG. 17.
Figure 22:
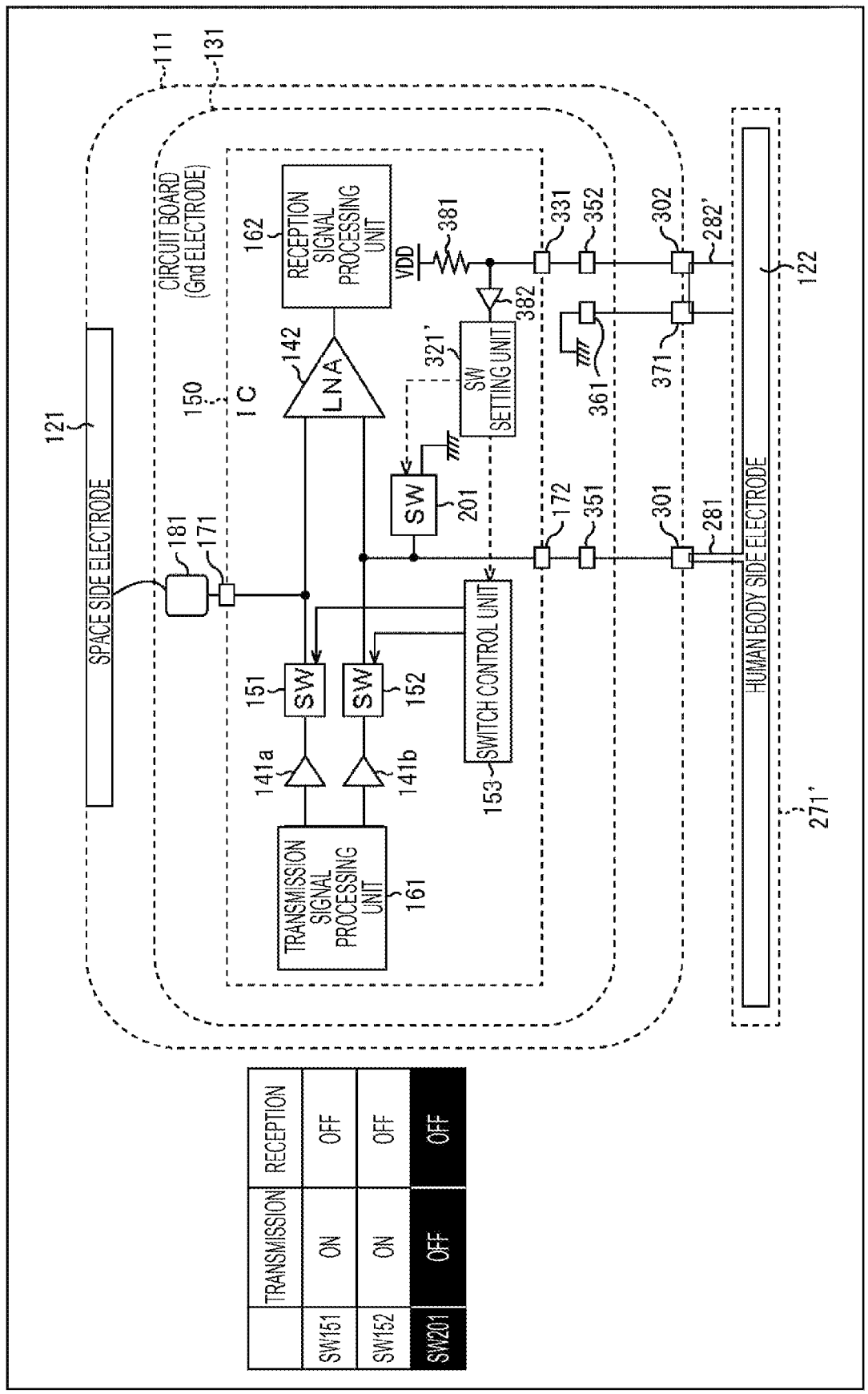
FIG. 22 is a diagram for describing a configuration example in the case of the two-pole configuration in the modification of the third embodiment of the transmission/reception device of FIG. 17.

In the above, an example has been described in which the switch setting unit 321 determines whether or not the switch setting unit 321 is connected to the jacket 282 via the terminals 331, 352, and 302, and controls the switch 201 depending on the determination result; however, the operation may be switched by either a High signal or a Low signal input to a switch setting unit 321', for example, with a configuration as illustrated in FIGS. 21 and 22 specifically.

In other words, between the terminal 331 and the switch setting unit 321', a comparator 382 in which a predetermined reference lower than a predetermined voltage set by a resistor 381 is set, and a power supply VDD are connected via the resistor 381, and a terminal 371 is provided in the vicinity of the terminal 302 and a terminal 361 connected to the ground potential of the circuit board 131, and a jacket 271' is provided including a terminal 282' that can connect across the terminal 371 and the terminal 302 in place of the jacket 271 including the protruding terminal 282.

With this configuration, in a case where the jacket 271' is not attached as illustrated in FIG. 21, the terminal 302 is set in the open state, whereby the predetermined voltage set by the resistor 381 is applied from the power supply VDD to the comparator 382 and the High signal is output, and thus the switch setting unit 321' recognizes that the electrode configuration is the two-pole configuration, and sets the switch 201 to on.

Similarly, in a case where the jacket 271 is attached as illustrated in FIG. 22, the terminal 302 is set in the grounded state, whereby the ground potential is applied to the comparator 382 and the Low signal is output, and thus the switch setting unit 321' recognizes that the electrode configuration is the three-pole configuration, and sets the switch 201 to off.

With this configuration, on/off of the switch 201 may be controlled by detecting the presence or absence of attachment of the jacket 271'. Note that, the switch control processing is similar to the processing described with reference to the flowchart of FIG. 20, so that the description will be omitted.

<Fourth Embodiment>

Figure 23:
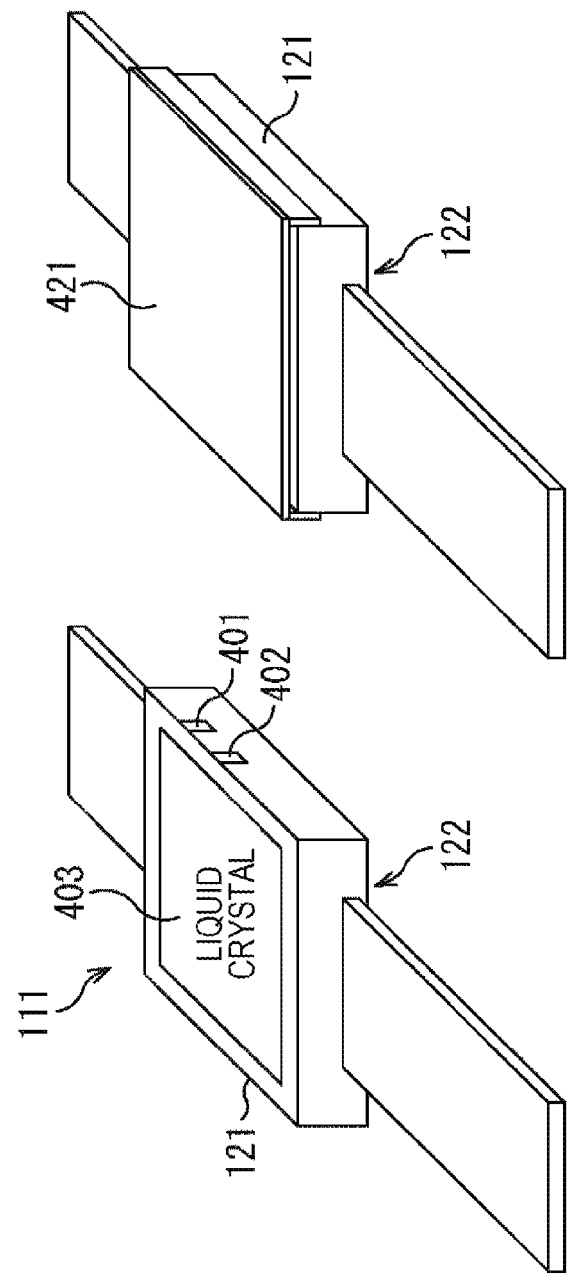
FIG. 23 is an exterior perspective view for describing an exterior of a transmission/reception device of a fourth embodiment of the present disclosure.

In the above, the smartphone type transmission/reception device 111 has been described; however, for example, a wristwatch type transmission/reception device 111 as illustrated in the left part of FIG. 23 may be set as the two-pole configuration. Moreover, as illustrated in the right part of FIG. 23, a lid 421 incorporating the space side electrode 122 is provided on a liquid crystal surface 403 that becomes a surface, in other words, on the space side, and the electrode configuration is switched by the presence or absence of the lid 421.

FIG. 23 illustrates an exterior configuration example of the wristwatch type transmission/reception device 111.

The wristwatch type transmission/reception device 111 is set as the two-pole configuration in which the space side electrode 121 is not provided. Furthermore, the side surface of the wristwatch type transmission/reception device 111 is provided with hole shaped terminals 401 and 402 for making connection by respectively inserting protruding terminals 421a and 421b, the protruding terminal 421a (FIGS. 24 and 25) serving also as a wiring line electrically connected to the space side electrode 121 provided on the lid 421 illustrated in the right part in the figure, the protruding terminal 421b (FIGS. 24 and 25) indicating that the lid 421 is united to the wristwatch type transmission/reception device 111. The wristwatch type transmission/reception device 111 is provided with the human body side electrode 122 at the bottom end portion.

The lid 421 incorporates the space side electrode 121, and is attached to the wristwatch type transmission/reception device 111 to cover the liquid crystal surface 403 of the wristwatch type transmission/reception device 111. At this time, the above-described protruding terminals 421a and 421b are respectively inserted into the hole shaped terminals 401 and 402.

<Configuration Example of Transmission/Reception Device of FIG. 23>

Next, with reference to the block diagrams of FIGS. 24 and 25, a configuration example will be described of the transmission/reception device 111 of FIG. 23.

Figure 24:
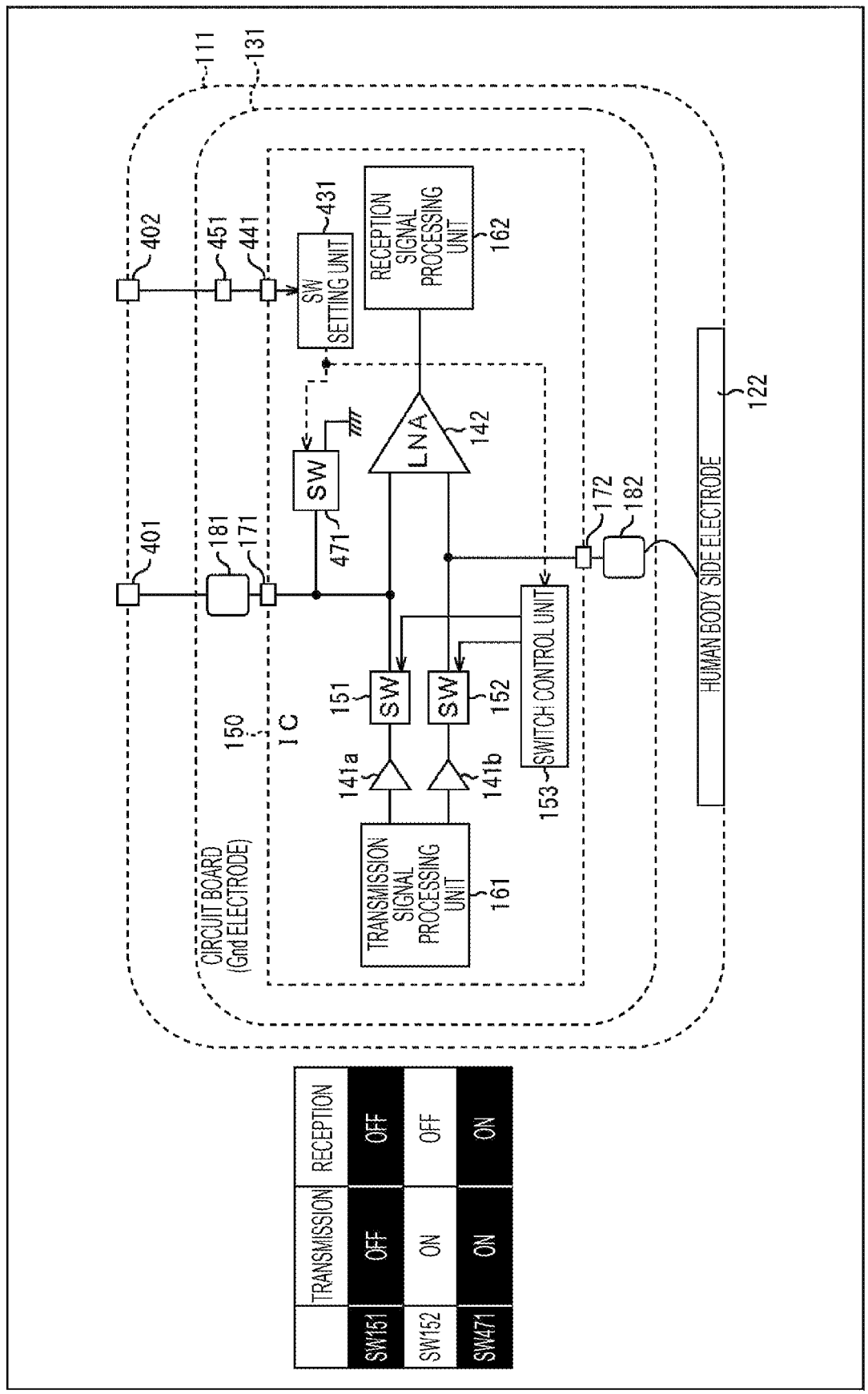
FIG. 24 is a diagram for describing a configuration example in the case of the three-pole configuration in the fourth embodiment of the transmission/reception device of FIG. 23.
Figure 25:
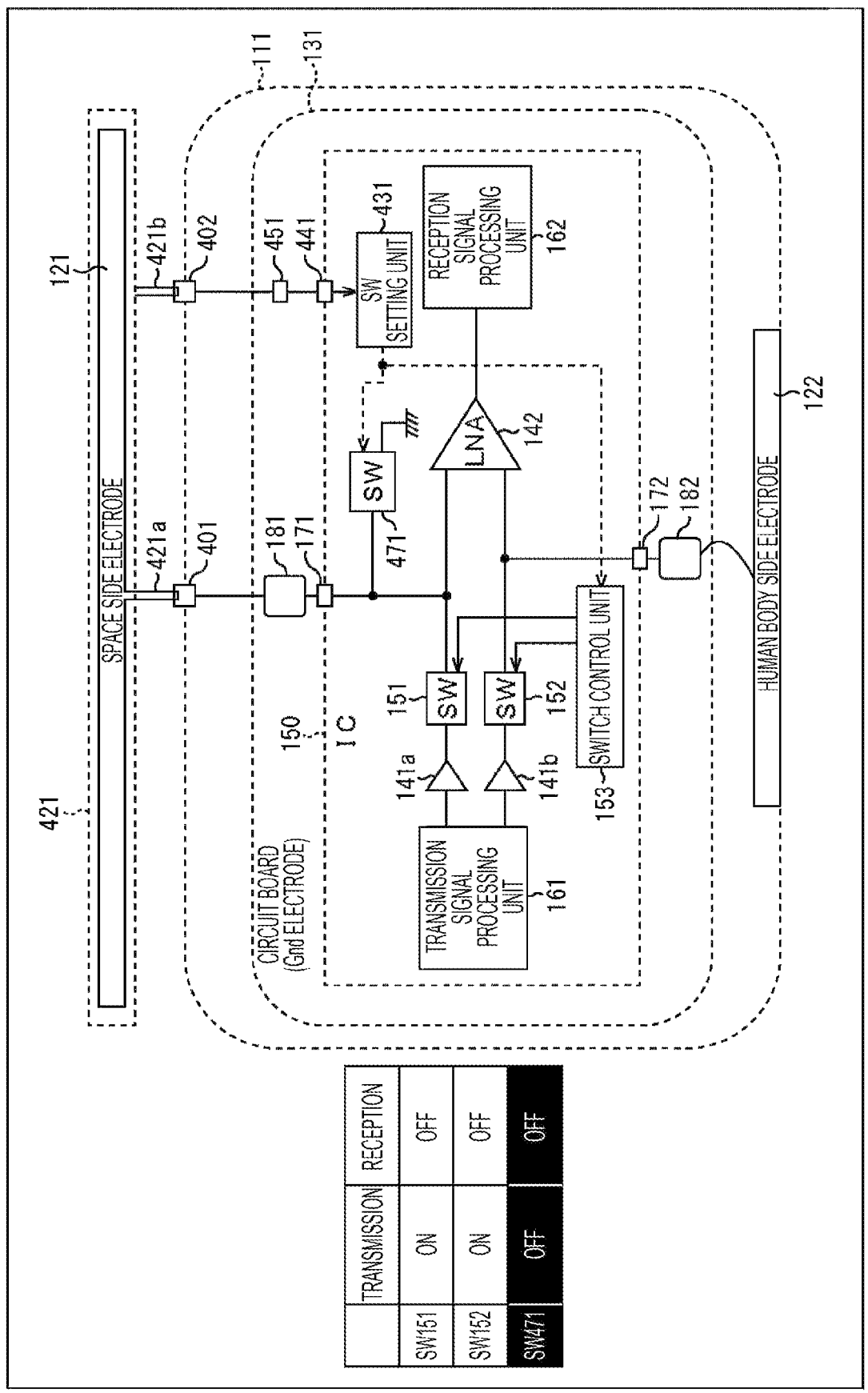
FIG. 25 is a diagram for describing a configuration example in the case of the two-pole configuration in the fourth embodiment of the transmission/reception device of FIG. 23.

In the configuration of the transmission/reception device 111 of FIGS. 24 and 25, constituents having the same functions as those in the transmission/reception device 111 of FIGS. 7 and 8 are denoted by the same reference signs and the same names, and descriptions thereof will be omitted as appropriate.

In other words, in the transmission/reception device 111 of FIGS. 24 and 25, difference from the transmission/reception device 111 of FIGS. 7 and 8 is that a switch (SW) control unit 421 is provided, and that a terminal 181 on the circuit board 131 and the hole shaped terminal 401 are provided for the connection terminal 171 to be electrically connected to the terminal 421a of the space side electrode 121, and a connection terminal 441, a terminal 451 on the circuit board 131, and the hole shaped terminal 402 are provided for the switch setting unit 431 to be connected to the terminal 421b of the lid 421.

In other words, as illustrated in FIG. 24, in the two-pole configuration without the lid 421, the switch 471 is controlled to be fixedly turned on by the switch setting unit 431, whereby the connection terminal 171 is set to the ground potential. Furthermore, as illustrated in FIG. 25, in the three-pole configuration in which the lid 421 is attached, the switch 471 is controlled to be fixedly turned off by the switch setting unit 431, whereby the connection terminal 171 is set to a potential equal to the space side electrode 121.

The switch setting unit 431 determines whether or not the lid 421 is connected to the switch setting unit 431 via the terminal 421b when the lid 421 is attached to the wristwatch type transmission/reception device 111, and controls on or off of the switch 471 depending on the determination result.

More specifically, as illustrated in FIG. 24, when it is recognized that the terminal 421b is not connected to the switch setting unit 431 via the terminal 441, the switch setting unit 431 regards that the lid 421 is not attached to the transmission/reception device 111, and recognizes that the electrode configuration is the two-pole configuration as a whole. At this time, the switch setting unit 431 performs control to turn on the switch 471.

Furthermore, as illustrated in FIG. 25, when it is recognized that the terminal 421b is connected to the switch setting unit 431 via the terminal 441, the switch setting unit 431 regards that the terminal 421a of the space side electrode 121 incorporated in the lid 421 and the terminal 401 are connected to each other and the lid 421 is attached to the transmission/reception device 111, and recognizes that the electrode configuration is the three-pole configuration as a whole. At this time, the switch setting unit 431 performs control to turn off the switch 471.

In other words, as illustrated in FIG. 24, in the two-pole configuration, the switch 471 is controlled to be fixedly turned on by the switch setting unit 431, whereby the connection terminal 171 is set to the ground potential. As illustrated in FIG. 25, in the three-pole configuration, the switch 471 is controlled to be fixedly turned off by the switch setting unit 431, whereby the connection terminal 171 is set to the same potential as the space side electrode 121.

<Switch Setting Processing by Transmission/Reception Device of FIGS. 24 and 25>

Next, with reference to the flowchart of FIG. 26, the switch setting processing will be described of the switch setting unit 431 of the transmission/reception device 111 of FIGS. 24 and 25.

In step S91, the switch setting unit 431 determines whether or not the terminal 441 is connected to the terminal 421b, thereby determining whether or not the terminal 421a of the lid 421 incorporating the space side electrode 121 is connected to the terminal 401 and the electrode configuration is the three-pole configuration. In step S91, in a case where it is determined that the electrode configuration is the three-pole configuration, the processing proceeds to step S92.

In step S92, the switch setting unit 431 sets the switch 471 fixedly in the off state. Furthermore, the switch setting unit 431 performs setting to cause the switch 151 to autonomously operate by controlling the switch control unit 153. Here, since the switch 471 is provided on the switch 151 side, the switch 151, not the switch 152, is set to autonomously operate. By this processing, in the case of the three-pole configuration in which the lid 421 is attached to the transmission/reception device 111 as illustrated in FIG. 25, the connection terminal 171 is set in a state of the same potential as the space side electrode 121, and the electrode configuration is set to the three-pole configuration. Note that, in step S91, in a case where the electrode configuration is not the three-pole configuration, the processing of step S92 is skipped.

In step S93, the switch setting unit 431 determines whether or not the terminal 441 is connected to the terminal 421b, thereby determining whether or not the terminal 421a of the lid 421 incorporating the space side electrode 121 is not connected to the terminal 401 and the electrode configuration is the two-pole configuration. In step S93, in a case where it is determined that the electrode configuration is the two-pole configuration, the processing proceeds to step S94.

In step S94, the switch setting unit 431 sets the switch 471 fixedly in the on state. Furthermore, the switch setting unit 431 performs setting to fixedly turn off the switch 151 by controlling the switch control unit 153. Here, since the switch 471 is provided on the switch 151 side, the switch 151, not the switch 152, is set to off. By this processing, in the case of the two-pole configuration in which the lid 421 is not attached to the transmission/reception device 111 as illustrated in FIG. 24, the connection terminal 171 is set in the state of the ground potential, and the electrode configuration is set to the two-pole configuration. Note that, in step S93, in a case where the electrode configuration is not the two-pole configuration, the processing of step S94 is skipped.

In step S95, the switch setting unit 431 determines whether or not an end instruction is given, and in a case where the end instruction is not given, the processing returns to step S91, and the processing of step S91 and the subsequent steps is repeated. Then, in step S95, in a case where the end instruction is given, the processing is ended.

By the above processing, it is possible to determine whether the electrode configuration is the three-pole configuration or the two-pole configuration depending on whether or not the lid 421 is attached to the wristwatch type transmission/reception device 111, and the electrode configurations can be switched and used. Furthermore, as a result, by attaching the lid 421, the electrode configuration is set to the three-pole configuration, whereby the sensitivity at the time of the transmission processing can be improved to about twice.

As described above, according to the transmission/reception device in the human body communication of the present disclosure, it is possible to switch and use the electrode configuration, with the same configuration, depending on the change in the required electrode configuration.

<Example of Execution by Software>

By the way, a series of the processing steps described above can be executed by hardware; however, it can also be executed by software. In a case where the series of the processing steps is executed by the software, a program configuring the software is installed from a recording medium to a computer incorporated in dedicated hardware, or, for example, a general purpose personal computer or the like capable of executing various functions by installing various programs.

FIG. 27 illustrates a configuration example of a general purpose personal computer. The personal computer incorporates a Central Processing Unit (CPU) 1001. The CPU 1001 is connected to an input/output interface 1005 via a bus 1004. The bus 1004 is connected to Read Only Memory (ROM) 1002 and Random Access Memory (RAM) 1003.

The input/output interface 1005 is connected to an input unit 1006 including input devices such as a keyboard and a mouse for a user to input an operation command, an output unit 1007 for outputting to a display device a processing operation screen and an image of a processing result, a storage unit 1008 including a hard disk drive and the like for storing programs and various data, and a communication unit 1009 including a Local Area Network (LAN) adapter and the like for executing communication processing via a network typified by the Internet. Furthermore, a drive 1010 is connected for reading data from and writing data to a removable medium 1011 such as a magnetic disk (including flexible disk), an optical disk (including Compact Disc-Read Only Memory (CD-ROM) and a Digital Versatile Disc (DVD)), a magneto-optical disk (including Mini Disc (MD)), or a semiconductor memory.

The CPU 1001 executes various types of processing in accordance with a program stored in the ROM 1002, or a program read from the removable medium 1011, such as the magnetic disk, the optical disk, the magneto-optical disk, or the semiconductor memory, to be installed to the storage unit 1008, and loaded to the RAM 1003 from the storage unit 1008. In the RAM 1003, data necessary for the CPU 1001 to execute the various types of processing or the like is also stored appropriately.

In the computer configured as described above, for example, the CPU 1001 loads the program stored in the storage unit 1008 to the RAM 1003 via the input/output interface 1005 and the bus 1004 to execute the series of the processing steps described above.

The program executed by the computer (CPU 1001) can be provided, for example, by being recorded in the removable medium 1011 as a package medium or the like. Furthermore, the program can be provided via a wired or wireless transmission medium such as a local area network, the Internet, or digital satellite broadcasting.

In the computer, the program can be installed to the storage unit 1008 via the input/output interface 1005 by mounting the removable medium 1011 to the drive 1010. Furthermore, the program can be installed to the storage unit 1008 by receiving with the communication unit 1009 via the wired or wireless transmission medium. Besides, the program can be installed in advance to the ROM 1002 and the storage unit 1008.

Note that, the program executed by the computer can be a program by which the processing is performed in time series along the order described herein, and can be a program by which the processing is performed in parallel or at necessary timing such as when a call is performed.

Furthermore, herein, a system means an aggregation of a plurality of constituents (device, module (component), and the like), and it does not matter whether or not all of the constituents are in the same cabinet. Therefore, a plurality of devices that is accommodated in a separate cabinet and connected to each other via a network and one device that accommodates a plurality of modules in one cabinet are both systems.

Note that, the embodiment of the present disclosure is not limited to the embodiments described above, and various modifications are possible without departing from the scope of the present disclosure.

For example, the present disclosure can adopt a configuration of cloud computing that shares one function in a plurality of devices via a network to process in cooperation.

Furthermore, each step described in the above flowchart can be executed by sharing in a plurality of devices, other than being executed by one device.

Moreover, in a case where a plurality of pieces of processing is included in one step, the plurality of pieces of processing included in the one step can be executed by sharing in a plurality of devices, other than being executed by one device.

Note that, the present disclosure can also adopt the following configurations.

<1> A transmission/reception device including:
a transmission unit used at time of transmission of a signal using a human body as a communication medium;
a reception unit used at time of reception of the signal using the human body as the communication medium; and
a switching unit that switches circuit configurations of the transmission unit and the reception unit depending on an electrode configuration.

<2> The transmission/reception device according to <1>, in which
the electrode configuration is one of a three-pole configuration including three electrodes and a two-pole configuration including two electrodes.

<3> The transmission/reception device according to <2>, further including:
a circuit board Gnd including a Gnd pattern functioning as an electrode of a circuit board on which a circuit configuring the transmission unit and the reception unit is provided;
a first switch that switches, by on or off, connection to a first electrode connected to one of transmission drivers each transmitting a signal by a differential output transmitting a signal by a differential output by operation of the transmission unit; and a second switch that switches, by on or off, connection to a second electrode connected to another of the transmission drivers, in which
the switching unit,
in a case where either the first electrode or the second electrode is not connected, regards the electrode configuration as the two-pole configuration, and fixedly sets to off the first switch or the second switch to which either the first electrode or the second electrode is not connected, and causes the first switch or the second switch to which either the first electrode or the second electrode is connected, to turn on at the time of transmission and to turn off at the time of reception, and
in a case where both the first electrode and the second electrode are connected, regards the electrode configuration as the three-pole configuration, and causes the first switch and the second switch to turn on at the time of transmission and to turn off at the time of reception.

<4> The transmission/reception device according to <3>, in which
operation is set for the switching unit by a setting device outside, and
in a case where the electrode configuration is the three-pole configuration and neither the first switch nor the second switch is fixedly set to off by the setting device, the switching unit causes the first switch and the second switch to turn on at the time of transmission and to turn off at the time of reception, and
in a case where the electrode configuration is the two-pole configuration and the first switch or the second switch is fixedly set to off by the setting device, the switching unit causes the first switch or the second switch not set to the off to turn on at the time of transmission and to turn off at the time of reception.

<5> The transmission/reception device according to <3>, further including
a setting unit that sets operation of the switching unit, in which
in a case where the electrode configuration is the three-pole configuration and neither the first switch nor the second switch is fixedly set to off by the setting unit, the switching unit causes the first switch and the second switch to turn on at the time of transmission, and causes the first switch and the second switch to turn off at the time of reception, and
in a case where the electrode configuration is the two-pole configuration and the first switch or the second switch is fixedly set to off by the setting unit, the switching unit causes the first switch or the second switch not set to the off to turn on at the time of transmission and to turn off at the time of reception.

<6> The transmission/reception device according to <5>, in which
the setting unit determines whether the electrode configuration is the two-pole configuration or the three-pole configuration depending on whether or not a configuration detachable to the transmission/reception device and including one of the first electrode and the second electrode is attached, and sets the operation of the switching unit depending on a determination result.

<7> The transmission/reception device according to <6>, in which the configuration including one of the first electrode and the second electrode includes a jacket attached to a smartphone when the transmission/reception device is the smartphone, or a lid of a wristwatch when the transmission/reception device is the wristwatch.

<8> The transmission/reception device according to <2>, further including:

a circuit board Gnd including a Gnd pattern functioning as an electrode of a circuit board on which a circuit configuring the transmission unit and the reception unit is provided; and two terminals respectively connectable to the first electrode and the second electrode in the reception unit except the circuit board Gnd, in which in a case of the circuit board Gnd, the first electrode, and the second electrode, the switching unit grounds, to the circuit Gnd, a terminal to which the electrode is not connected among the two terminals.

<9> The transmission/reception device according to any of <3> to <8>, in which the first electrode and the second electrode include a human body side electrode and a space side electrode.

<10> A transmission/reception method of a transmission/reception device including:

a transmission unit used at time of transmission of a signal using a human body as a communication medium; and a reception unit used at time of reception of the signal using the human body as the communication medium, the transmission/reception method including a step of switching circuit configurations of the transmission unit and the reception unit depending on an electrode configuration.

<11> A program causing a computer to function as:

a transmission unit used at time of transmission of a signal using a human body as a communication medium;

a reception unit used at time of reception of the signal using the human body as the communication medium; and a switching unit that switches circuit configurations of the transmission unit and the reception unit depending on an electrode configuration.

REFERENCE SIGNS LIST

33 Communication medium (human body)
111 Transmission/reception device
112 Belt
121 Space side electrode
122 Human body side electrode
131 Circuit board
132 Battery
141, 141a, 141b Output driver
142 Reception input amplifier
143 Switch
151, 152 Switch
153 Switch control unit
154 Impedance
161 Transmission signal processing unit
162 Reception signal processing unit
171 Switch
221 Switch setting device
222 Operation unit
231 Switch setting device
232 Operation unit
241 Switch setting device
242 Operation unit
321, 321' Switch setting unit
431 Switch setting unit

The invention claimed is:

1. A transmission/reception device, comprising:
a transmission unit configured to transmit a signal via a human body as a communication medium;
a reception unit configured to receive the signal via the human body as the communication medium;
a switching unit configured to switch between circuit configurations of the transmission unit and the reception unit based on an electrode configuration, wherein
the electrode configuration is one of a three-pole configuration or a two-pole configuration, and
the three-pole configuration includes three electrodes and the two-pole configuration includes two electrodes; and
a setting unit configured to:
determine the electrode configuration from one of the two-pole configuration or the three-pole configuration based on a connection state of at least one of a first electrode of the electrode configuration or a second electrode of the electrode configuration with the transmission/reception device; and
set an operation mode of the switching unit based on the determination of the electrode configuration.

2. The transmission/reception device according to claim 1, further comprising:
a circuit board Gnd including a Gnd pattern, wherein
the Gnd pattern comprises a plurality of transmission drivers,
each transmission driver of the plurality of transmission drivers is configured to transmit a differential output signal based on an operation of the transmission unit,
the Gnd pattern is an electrode of the circuit board Gnd, and
the transmission unit and the reception unit are on the circuit board Gnd;
a first switch configured to switch, by on or off, based on a connection of the first switch to the first electrode, wherein the first electrode is connected to a first transmission driver of the plurality of transmission drivers; and
a second switch configured to switch, by on or off, based on a connection of the second switch to the second electrode, wherein
the second electrode is connected to a second transmission driver of the plurality of transmission drivers, in the two-pole configuration,
one of the first electrode or the second electrode is disconnected to the transmission/reception device and the other of the first electrode or the second electrode is connected to the transmission/reception device, the switching unit is further configured to:
turn off one of the first switch or the second switch based on the disconnection of the one of the first electrode or the second electrode, and
control, based on the connection of the other of the first electrode or the second electrode, the other of the first switch or the second switch to turn on at a time of transmission, and turn off at a time of reception,
in the three-pole configuration,
both the first electrode and the second electrode are connected to the transmission/reception device, and the switching unit is further configured to:
    turn on each of the first switch and the second switch at the time of transmission, and
    turn off the each of the first switch and the second switch at the time of reception.

3. The transmission/reception device according to claim 2, further comprising:
    a first terminal; and
    a second terminal, wherein
        the first terminal is in connection with the one of the first electrode or the second electrode,
        the switching unit is further configured to ground the second terminal, and
        the second terminal is grounded based on a disconnection between the second terminal and the other of the first electrode or the second electrode.

4. The transmission/reception device according to claim 2, wherein
    the first electrode and the second electrode include a human body side electrode and a space side electrode.

5. The transmission/reception device according to claim 1, wherein
    in the electrode configuration, one of the first electrode or the second electrode includes a jacket,
    the transmission/reception device is one of a smartphone or a wristwatch, and
    the jacket is in contact with one of the smartphone or a lid of the wristwatch.

6. A transmission/reception method, comprising:
in a transmission/reception device:
    transmitting, by a transmission unit of the transmission/reception device, a signal via a human body as a communication medium;
    receiving, by a reception unit of the transmission/reception device, the signal via the human body as the communication medium;
    switching unit of the transmission/reception device, between circuit configurations of the transmission unit and the reception unit based on an electrode configuration, wherein
        the electrode configuration is one of a three-pole configuration or a two-pole configuration, and
        the three-pole configuration includes three electrodes and the two-pole configuration includes two electrodes;
    determining, by a setting unit of the transmission/reception device, the electrode configuration from one of the two-pole configuration or the three-pole configuration based on a connection state of at least one of a first electrode of the electrode configuration or a second electrode of the electrode configuration with the transmission/reception device; and
    setting, by the setting unit, an operation mode of the switching unit based on the determination of the electrode configuration.

7. A non-transitory computer-readable medium having stored thereon computer-executable instructions which, when executed by a computer, cause the computer to execute operations, the operations comprising:
    transmitting, by a transmission unit of a transmission/reception device, a signal via a human body as a communication medium;
    receiving, by a reception unit of the transmission/reception device, the signal via the human body as the communication medium;
    switching, by a switching unit of the transmission/reception device, between circuit configurations of the transmission unit and the reception unit based on an electrode configuration, wherein
        the electrode configuration is one of a three-pole configuration or a two-pole configuration, and
        the three-pole configuration includes three electrodes and the two-pole configuration includes two electrodes;
    determining, by a setting unit of the transmission/reception device, the electrode configuration from one of the two-pole configuration or the three-pole configuration based on a connection state of at least one of a first electrode of the electrode configuration or a second electrode of the electrode configuration with the transmission/reception device; and
    setting, by the setting unit, an operation mode of the switching unit based on the determination of the electrode configuration.

* * * * *